United States Patent

[11] 3,601,589

[72] Inventor William H. McCarty
 Hunterdon, N.J.
[21] Appl. No. 859,474
[22] Filed Sept. 19, 1969
[45] Patented Aug. 24, 1971
[73] Assignee Mobile Oil Corporation

[54] PROCESS AND APPARATUS FOR PRODUCING COLORED CHEMICAL COATINGS
 25 Claims, 3 Drawing Figs.

[52] U.S. Cl. .................................................. 235/150
[51] Int. Cl. .................................................. G06f 7/00
[50] Field of Search .................................... 356/175; 235/150

[56] References Cited
OTHER REFERENCES

Color in Business, Science, and Industry, Judd and Wyszecki, Wiley, New York (1967), pp. 387- 426, Kubelka-Munk Analysis "Digital Computer Color Matching"; Eugene Allen; American Dyestuff Reporter; May 10, 1965; pp. 57- 63

"Basic Equations Used in Computer Color Matching"; Eugene Allen; Journal of the Optical Society of America; Vol. 56, No. 9; Sept. 1966

Primary Examiner—Malcolm A. Morrison
Assistant Examiner—Edward J. Wise
Attorneys—Oswald G. Hayes, Andrew L. Gaboriault and James F. Powers, Jr.

ABSTRACT: A computer-aided color formulation process is provided wherein a color standard is matched by a blend of pigments from a library of pigments. Reflectance values of the standard color at a plurality of reflectance points are supplied to a computer programmed to select pigments from the library and to approximate concentrations of the selected pigments to give a match to the reflectance data of the standard. The computer is also programmed to generate the pigment composition from a group of those selected to match the color of the standard, and to determine the metameric index of the match. The color of a blend of library pigments prepared in response to the concentration values generated by the computer is measured by a colorimeter under daylight to insure that the difference in color coordinates between the blend and the standard is within tolerance. If the color coordinate difference is not within tolerance, the process provides for determining the amount of selected pigment addition necessary to shade the blend to provide a color coordinate difference within tolerance. The blend is then measured by the colorimeter under incandescent light to insure that the metameric index is within tolerance.

PROCESS AND APPARATUS FOR PRODUCING COLORED CHEMICAL COATINGS

BACKGROUND OF THE INVENTION

1. Field of the Invention

This invention relates to process and apparatus for color formulation. More particularly, it relates to computer-aided process and apparatus for formulating colored chemical coatings.

2. Description Of the Prior Art

Color is the psychological response of the observer to the sum of the visible radiant energy, reflected from an object. The factors that determine color are the natures of the light source, the eye of the observer, and the reflecting surface.

A light source can be characterized by measuring its intensity as a function of wavelength in the visible region of the spectra. Standard light sources are defined in *Color in Business, Science, and Industry* by Judd and Wyszecki, Wiley, New York (1967), pp. 108. These are:

Source A - incandescent light
Source B - noon sunlight
Source C - average daylight.

If colors which match under one light source do not match under a different light source, the match is termed "metameric." In general, a color match should have as little metamerism as possible.

The most difficult aspect of color is the nature of the eye of the observer. Since it is rare that two observers are identical, a standard or average must be defined. The standard observer used today was recommended in 1931 by the International Commission of Illumination, and is discussed at page 111 of *Color in Business, Science, and Industry* noted above.

The standard observer is defined in terms of the amount of red, green, and blue primary lights (called the tristimulus values) required to produce a color match to light of a given wavelength and unit intensity. The tristimulus values of the standard observer can be combined with the light intensity of the standard sources. This result is shown in *Color in Business, Science, and Industry* at pages 132–133. These results are called the tristimulus values of the standard sources A, B, and C.

The appearance of the surface of an opaque object is characterized by its reflectance spectrum which is a function of the wavelength of the incident light and is measured (generally at 10 millimicron intervals) with a spectrophotometer.

The tristimulus values for a surface illuminated by a standard light source can be calculated as the product of the reflectance and the tristimulus values of the standard source at each wavelength.

The color is the sum of the tristimulus values of the surface over the visible wavelengths. Since there are three tristimulus values at each wavelength, the result of the summation is three numbers, called the tristimulus coordinates of the color. A plot of all conceivable tristimulus coordinates generates a space in three dimensions called color space.

The quantitative measure of color coordinates is performed by a colorimeter which automatically measures the reflectance spectrum and performs the necessary multiplications and summations.

The problem in color matching is to generate an experimental surface that has the same tristimulus coordinates as the standard surface. This can be done by generating a surface which has the same reflectance spectrum as the standard. Such a surface would be a "spectral match" to the standard. A spectral match is sufficient to guarantee a nonmetameric color match. That is, the surface generated will match the standard under any light source. A spectral match is not necessary to obtain a color match under a single light source. Surfaces having quite different reflectance spectra can be color matched. However, the matches will be metameric.

It has long been a problem in the chemical coatings art to match a standard color with a blend of pigments. For example, a coatings manufacturer may receive a sample standard from an automobile manufacturer with a solicitation for a bid on a predetermined amount of chemical coating having a color matching that of the standard. The chemical coatings manufacturer is then faced with the problem of matching the standard with a combination of pigments.

A trial and error method for color matching provides for inspecting the color of the standard and then guessing the pigments in a library and relative concentrations necessary to provide a color matching blend. A blend of pigments is then prepared based on the pigment and concentration guesses. The blend is sprayed on a sheet of metal to provide a panel and the panel is compared with the standard in daylight. If the visual inspection indicates that the standard and the panel do not match, the colorist guesses at the amount of pigments to add to the blend and the new blend is applied to another panel. The colorist again visually compares the standard and the panel and this procedure is repeated until the colorist visually observes a match. The colorist then observes the standard and the matching panel under incandescent light. If there is no match under incandescent light, the colorist repeats the foregoing steps until a match is obtained under incandescent light. Thereupon, the colorist prepares a formula indicating the pigments and concentrations thereof necessary to provide a blend of pigments having a color which matches that of the standard.

Thus, in the trial and error method, colorists are required to exercise human judgement based on visual observation and experience.

It is also known to use a spectrophotometer for measuring reflectance values of the sample, and guess the pigments and pigment concentrations of the sample based on an inspection of the measured reflectance values. Further, it is known to use a colorimeter to determine the differences in color between the pigment blend and the sample under light sources A and C. However, it is still necessary to exercise human judgment.

SUMMARY OF THE INVENTION

In accordance with the present invention there is provided a process of selecting pigments for a pigment library having a standard pigment to color match a colored surface coating. The process comprises operating an automatic processing system to perform the steps of generating signals representative of the reflectance spectrum of the surface coating, and generating signals representative of absorption constants and scattering constants of N library pigments $N>1$. In response to these signals, the process generates signals representative of $N-1$ concentration ratios between $n-1$ nonstandard library pigments and the standard library pigment, in accordance with:

$$\left(1-\frac{2R'}{1+R'^2}\left(1+\frac{K_1}{S_1}\right)\right)=\sum_{i=2}^{N}\left[\frac{2R'}{1+R'}\left(\frac{K_i+S_i}{S_1}\right)-\frac{S_i}{S_1}\right]\frac{C_i}{C_1}$$

where $R'$ = the corrected reflectance of the surface coating at a given wavelength, $K_1, S_1$ = the absorption and scatter constants of the standard library pigment at a given wavelength, $K_i, S_i$ = the absorption and scatter constants of the $i^{th}$ pigment in the library, at a given wavelength, $N$ = the number of pigments to be considered from the library, and $C_i/C_1$ = the concentration ratio of the $i^{th}$ pigment to the standard pigment.

In response to the $N-1$ concentration ratio signals, the process generates signals representative of selected library pigments for use in matching the color of the surface coating.

In accordance with another aspect of the present invention the concentration ratio $C_i/C_1$ values are refined by nonlinear least square solution procedures based on the total differential of the dependent variable.

In accordance with still another aspect, the concentrations $C_i$ and $C_1$ are weight fractions and the process generates a signal representative of the weight fraction of the standard pigment in accordance with $$C_1 = 1 \bigg/ \left(1 + \sum_{i=1}^{N} C_i/C_1\right)$$

and generates signals representative of the weight fractions of the nonstandard library pigments considered from the library in accordance with $$C_i = (C_i/C_1)(C_1), \quad i=2...N,$$

where $C_1$ = weight fraction of the standard pigment, $N$ = the number of pigments considered from the library, and $C_i/C_1$ = the concentration ratio of the $i^{th}$ pigment to the standard pigment.

In accordance with yet another aspect of the present invention, a signal representative of a predetermined weight fraction is generated. The weight fraction signals of the nonstandard library pigments are compared with the predetermined weight fraction signal, and the compared weight fraction signals having a value less than the predetermined weight fraction signal are eliminated from further processing. The process is then repeated until each of the remaining nonstandard pigments has a weight fraction at least as great as the predetermined weight fraction.

A further aspect of the invention provides a system for selecting pigments from a pigment library having a standard pigment to color match a colored surface coating. The system comprises means for generating signals representative of the reflectance spectrum of the surface coating, and means for generating signals representative of absorption constants (K) and scattering constants (S) of N library pigments, $N>1$. The system also includes means responsive to these signals for generating signals representative of $N-1$ concentration ratios between $N-1$ nonstandard library pigments and the standard library pigment, in accordance with:

$$\left(1 - \frac{2R'}{1+R'^2}\left(1 + \frac{K_1}{S_1}\right)\right) = \sum_{i=2}^{N} \left[\frac{2R'}{1+R'}\left(\frac{K_i + S_i}{S_1}\right) - \frac{S_i}{S_1}\right]\frac{C_i}{C_1}$$

where $R'$ = the corrected reflectance of the surface coating at a given wavelength, $K_1, S_1$ = the absorption and scatter constants of the standard library pigment at a given wavelength, $K_i, S_i$ = the absorption and scatter constants of the $i^{th}$ pigment in the library at a given wavelength, $N$ = the number of pigments to be considered from the library, and $C_i/C_1$ = the concentration ratio of the $i^{th}$ pigment to the standard pigment.

Thus, the present invention provides a process and a system for minimizing the need for exercising human judgement in selecting pigments to color match a standard color.

DESCRIPTION OF SPECIFIC EMBODIMENTS

Figure 1:
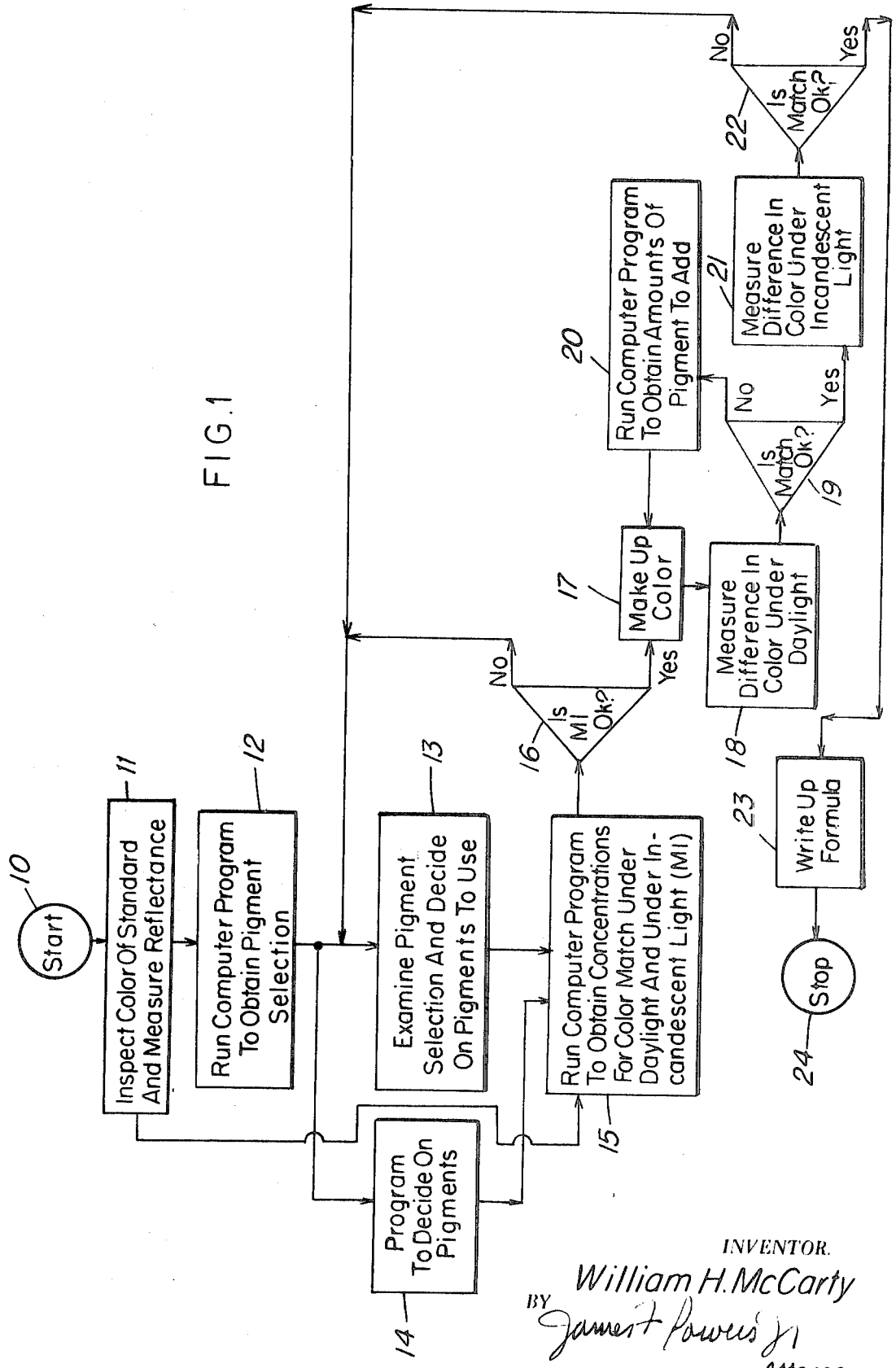
FIG. 1 is a block diagram of a computer-aided color formulation process.

An Iterative Procedure for Solving Systems of Nonlinear Equations

Since linear equation theory is the basis of nonlinear solution procedures used in this invention, an outline of the applicable linear theory is presented before proceeding to the technique used to solve nonlinear equations.

Assume that a theoretical relationship exists between a dependent variable $y$, and a number of independent variables $X_i$ ($i=1, 2...N$) as given by equation (1).

$$y = \sum_{i=1}^{N} k_i X_i \qquad (1)$$

The unknown coefficients, $k_i$, are calculated by use of $p$ different measurements of the dependent variable $y$, made at $p$ different settings of the independent variables. The experimental measurement is designated by $\overset{\circ}{y}_j$ ($j=1, 2...p$), and there results a system of $p$ equations in $N$ unknowns.

The system of equations can be written in matrix notation as given by equation (2).

$$\vec{y} = [X]\vec{k} \qquad (2)$$

where $\vec{y}$ = a column vector whose elements are the predicted values of $y_j$ ($j=1...p$)

$\vec{k}$ = a column vector whose elements are the unknown $k_i$ ($i=1...N$)

$[X]$ = the matrix of independent variable settings, whose elements are $X_{ji}$; the subscripts designating the row and column respectively.

If $p=N$, the desired values of $k_i$ can be obtained by inverting $X$. Thus, $$\vec{k} = [X]^{-1}\vec{y} \qquad (3)$$

where $[X]^{-1}$ = the inverse of $[X]$

Normally however, the number of experimental $y$ are chosen so that $p>N$. In this case no solution of the equation (3) exists. Instead, the solution should satisfy some criteria involving both the experimental and predicted values of $y$.

If the error in the $y$ measurement in random, then the solution should minimize the sum of the squared deviations between the experimental and predicted $y$. In this case, the solution of equation (2) for $\vec{k}$, called the "least square solution," is given by equation (4).

where $$\vec{k} = [[X]^T[X]]^{-1}[X]^T\vec{y} \qquad (4)$$

$[X]^T$ = the transpose of $[X]$

That is, the solution of equation (4) minimizes S, where S is given by equation (5).

$$S = \sum_{j=1}^{p}(\hat{y}_j - y_j)^2 \qquad (5)$$

The equations (2) and (4) are true for linear systems. However, they can be used as a starting point in the iterative solution of some nonlinear systems.

For example, suppose that a nonlinear relationship exists between $y$ and $x$ of equation (6), and that equation (6) can be rearranged to give equation (7).

$$y_j = y_j(k_i, x_i), \quad (i=1...N) \qquad (6)$$

$$f(y_j) = \sum_{i=1}^{N}(f(X_{ji}, y_j))k_i \qquad (7)$$

That is, equation (6) can be linearized so that the left-hand side contains only $y$ and the right side is linear in the unknown $k_i$.

If the same set of experimental measurements were available as before, the set of equations (7) could be written in matrix notation as given by (8).

$$f(\vec{y}) = [X']\vec{k} \qquad (8)$$

where $[X'] =$ a matrix whose elements are $f(y_j, X_{ji})$.

Equation (8) resembles equation (2), except that the elements of the $X'$ matrix depend on the predicted value of the dependent variable. A formal solution can be obtained if the elements of the $X'$ matrix are evaluated using the experimental values of $y$. Thus a first estimate of $k$ can be obtained by use of equation (9).

$$\vec{k} = [[X']^T[X']]^{-1}[X']^T \vec{f(\overset{\circ}{y})} \quad (9)$$

The value of $\vec{k}$ obtained may be used to predict the values of $y$ by means of equation (6). In this way, a first estimate of the $k_i$ and the predicted $y_i$ can be found.

Successively better approximations to the desired least square solutions for $k_i$ are obtained by utilizing standard nonlinear least square solution techniques. These techniques are based on the total differential of the dependent variable, given by equation (10).

$$Dy_j = \sum_{i=1}^{N} \left(\frac{\partial y_j}{\partial k_i}\right) dk_i, \; j=1, 2, \ldots p \quad (10)$$

where the $(\partial y_j / \partial k_i)$ are obtained by differentiating (6).

The set of equations (10) can be written in matrix notation as given by equation (11).

$$\vec{Dy} = [P]\vec{dk} \quad (11)$$

where $\vec{Dy} =$ a column vector whose elements are the $Dy_j$.

$\vec{dk} =$ a column vector whose elements are the $dk_i$.

$[P] =$ a matrix of partial derivatives whose elements are the $\partial y_j / \partial k_i$. The elements of $\vec{Dy}$ are obtained from equation (12).

$$Dy_j = \overset{\circ}{y}_j - y_j \quad (12)$$

where $y_j$ is obtained from (6) using the current values of $k_i$.

That is, $\vec{Dy}$ is a vector that points in a direction towards the experimental values of $y$.

Substituting the P matrix for the $X'$ matrix and $\vec{Dy}$ for $\vec{f(\overset{\circ}{y})}$ in equation (9) leads to a solution $\vec{dk}$. The elements of $\vec{dk}$ are the changes that must be added to the current estimate of $k_i$ to obtain an improved estimate. Thus, the new values of $k_i$ are given by equation (13).

$$k_{i_{new}} = k_{i_{old}} + dk_i \quad (13)$$

The new $k_i$ are used to predict new values of $y_j$ and the entire procedure is repeated to obtain a still better estimate of $k_i$. If successive iterations lead to progressively smaller changes in $k_i$, the process is said to converge and may be terminated when the $k_i$ no longer change appreciably.

Since the solution obtained minimized the sum of the squared deviation between the experimental and predicted $y$, the procedure can be thought of as minimizing the distance squared (and thus the distance) between the coordinates of the experimental and predicted $y$ in a $p$ dimensional space.

COLOR THEORY

1. Kubelka-Munk Analysis

The Kubelka-Munk analysis described in *Color in Business, Science, and Industry* by Judd and Wyszecki, Wiley, New York (1967) relates the light scattering and absorption properties of pigment dispersions to the observed reflectance of a surface. If the pigment dispersion does not completely hide the substrate, then the reflectance of the substrate contributes to the overall reflectance of the surface. The equations derived by Kubelka and Munk treat both the case of complete and incomplete hiding.

Before proceeding to the description of these two cases, several assumptions of the theory should be pointed out. These assumptions are:

a. The surface reflectance is measured in a medium having the same refractive index as the pigment vehicle.

b. The pigment particles scatter light diffusely. Surface reflectance measurements are made in air, clearly violating the first assumption. The effect of the air-surface interface is accounted for through the use of a correction equation as given by (14).

$$R' = (R + \alpha)/(\beta + \gamma R) \quad (14)$$

where $R =$ the reflectance measured in air $R' =$ the equivalent reflectance measurement made in a medium of the same refractive index as the pigment vehicle.

The constants $\alpha, \beta, \gamma$ were determined at a color laboratory of the assignee of the invention as follows:

$\alpha = 0.005$
$\beta = 0.578$
$\gamma = 0.4$

The second assumption of the theory is valid for spherically shaped pigments, but is invalid for flakelike particles, for example, flaked aluminum.

a. Incomplete Hiding of the Substrate

The reflectance from a surface at incomplete hiding of the substance is given by equation (15).

$$R'' = \frac{R'(1 - R'Rg') + (Rg' - R')e^{-Z}}{(1 - R'Rg') + R'(Rg' - R')e^{-Z}} \quad (15)$$

where $R'' =$ the reflectance at incomplete hiding.

$R' =$ the reflectance at complete hiding.

$Rg' =$ the reflectance of the substrate $$Z = X \sum_{i=1}^{N} C_i S_i (1 - R'^2)/R'$$

$X =$ the weight of pigment per unit area.

$C_i S_i =$ the weight fraction concentration and scatter constant of the $i^{th}$ pigment in the mixture.

$N =$ the number of pigments in the mixture.

Equation (15) may be solved for $$X \sum_{i=1}^{N} C_i S_i$$

as given by (16).

$$X \sum_{i=1}^{N} C_i S_i = \frac{R'}{(1 - R'^2)} \ln \frac{[Rg' - R'][1 - R''R']}{[Rg'R' - 1][R' - R'']}$$

Equation (16) is used to calculate the absolute value of the scatter constant, S, generally for a standard white pigment. A paint containing the standard white is applied at several levels of incomplete hiding, and at complete hiding of the substrate. The weight of pigment per square foot, the reflectance of the substrate, and the reflectance of the coated substrate are measured. For a single pigment $$\sum_{i=1}^{N} C_i S_i = C_1 S_1$$

where $C_1$, the weight fraction concentration, is 1.0. Thus, equation (16) can be used to calculate $S$ for the standard pigment.

It will be shown below, that the absolute value of one pigment constant is sufficient for the calculation of absolute pigment constants for all other pigments, using reflectance data at complete hiding.

b. Complete Hiding of the Substrate

At complete hiding of the substrate, the relation between reflectance, pigment concentration, and pigment constants is given by equation (17).

$$\frac{(1 - R')^2}{2R'} = \frac{\sum_{i=1}^{N} K_i C_i}{\sum_{i=1}^{N} S_i C_i} \quad (17)$$

where $K_i =$ the absorption constant of the $i^{th}$ pigment and all other terms retain their former significance.

Equation (17) may be solved for $R'$, to give (18)

$$R' = 1 + \delta - \sqrt{\delta^2 + 2\delta} \qquad (18)$$

where $$\delta = \frac{\sum_{i=1}^{N} K_i C_i}{\sum_{i=1}^{N} S_i C_i} \qquad (19)$$

The value of $\delta$ depends on the relative values of the pigment constants, rather than their absolute values as demonstrated by dividing the numerator and denominator of $\delta$ by $S_1 C_1$, with the result shown in equation (20).

$$\delta = \frac{\sum_{i=1}^{N} \left(\frac{K_i}{S_1}\right)\left(\frac{C_i}{C_1}\right)}{1 + \sum_{i=2}^{N} \left(\frac{S_i}{S_1}\right)\left(\frac{C_i}{C_1}\right)} \qquad (20)$$

Thus, if the absolute value of $S_1$ is known, all other constants determined through the use of equation (17) will also have absolute values. If on the other hand, absolute values are not desired, the value of $S_1$ may be arbitrarily set equal to 1, and all other constants may be determined, relative to unity. The foregoing shows that at complete hiding there are two $N-1$ independent pigment constant ratios and $N-1$ independent concentration ratios in mixtures containing N pigments. The importance of these two relationships will be demonstrated below.

2. Color Coordinates and Metamerism

The tristimulus coordinates of a surface under a given light source are defined by equations (21), (22) and (23):

$$X = K \sum_{\lambda=400}^{700} H_x R \Delta \lambda \qquad (21)$$

$$Y = K \sum_{\lambda=400}^{700} H_y R \Delta \lambda \qquad (22)$$

$$Z = K \sum_{\lambda=400}^{700} H_z R \Delta \lambda \qquad (23)$$

where $$K = 100 \bigg/ \sum_{\lambda=400}^{700} H_y \Delta \lambda$$

$H_x, H_y, H_z$ = the tristimulus values of a standard light source such as given in *Color in Business, Science, and Industry*, supra,
$\lambda$ = the wavelength
$\Delta \lambda$ = the wavelength increment at which the reflectance $R$ is measured.

The coordinates X, Y, Z are transformed into the cube root coordinates L, $a$ and $b$ as given by equations (24), (25) and (26).

$$L = 25.29 G^{1/3} - 18.38 \qquad (24)$$
$$a = 106 (R^{1/3} - G^{1/3}) \qquad (25)$$
$$b = 42.34 (G^{1/3} - B^{1/3}) \qquad (26)$$

where
$$G = Y \qquad (27)$$
$$R = 1.0216 X - 0.00122 Z \qquad (28)$$
$$B = 0.8647 Z \qquad (29)$$

The physical significance of the coordinates are as follows:
$L$ = lightness
$a$ = redness—greenness
$b$ = yellowness—blueness The reflectance spectrum must be available to calculate the color coordinates of a surface. The reflectance may be measured on an existing panel, or the reflectance, $R'$, may be calculated by use of the Kubelka-Munk equations (15) or (18) and corrected to give R by use of equation (14).

The difference in color between two panels is represented by the difference in color coordinates. If the desired or standard color is designated by subscript $s$, and the color of the current batch is given by subscript $b$ then the color differences is provided by equations (30), (31) and (32).

$$\Delta L = L_s - L_b \qquad (30)$$
$$\Delta a = a_s - a_b \qquad (31)$$
$$\Delta b = b_s - b_b \qquad (32)$$

The color is "matched" when $\Delta L = \Delta a = \Delta b = 0$. Matching is done for the standard source C. When a match has been obtained, the values of $\Delta L$, $\Delta a$, and $\Delta b$ under source A are calculated to define the index of metamerism, MI, as given by equation (33).

$$MI = (\Delta L^2 + \Delta a^2 + \Delta b^2)^{1/2}_{source\ A} \qquad (33)$$

The metameric index is an indication of the light source dependency of the color match. In general, it is desirable to find a match that has the smallest metameric index.

A high metameric index is due to a poor spectral match. Poor spectral matches occur when the standard and batch colors are made from different pigments.

3. Vectors and Shading

The color coordinates (L, $a$, $b$) of a panel are functions of the concentrations of the pigments. That is $$L = L(\vec{C}) \qquad (34)$$
$$a = a(\vec{C}) \qquad (35)$$
$$b = b(\vec{C}) \qquad (36)$$

where
$\vec{C}$ = the concentration vector, whose elements are the fractional concentration of each pigment.

It is desirable to relate changes in color space to changes in concentration space. This is done through the total differential of the color coordinates.

The total differential of the color coordinate L can be written as $$dL = \sum_{i=1}^{N} \frac{\partial L}{\partial C_i} dC_i \qquad (37)$$

Similar expressions can be written for the total differentials of $a$ and $b$.

If a column vector $dL$ were defined as having the elements $dL$, $da$, and $db$, then the change in color coordinates with respect to a change in concentration coordinates can be written in matrix notation as $$\vec{dL} = [V] \vec{dC} \qquad (38)$$

where $$V = \begin{bmatrix} \frac{\partial L}{\partial C_1} & \frac{\partial L}{\partial C_2} & \cdots & \frac{\partial L}{\partial C_N} \\ \frac{\partial a}{\partial C_1} & & \cdots & \frac{\partial L}{\partial C_N} \\ \frac{\partial b}{\partial C_1} & & \cdots & \frac{\partial L}{\partial C_N} \end{bmatrix}$$

The matrix $V$ is the matrix of the transformation from differences in concentration space to difference in color space. In practice, the individual partial derivatives are called "vectors." This terminology should not be confused with the notion of vectors in matrix algebra.

Equation (38) is strictly true only for infinitesimal changes. However, in practice, it is desired to match colors which are close to one another, but observably different.

For this reason the $\Delta L$, $\Delta a$, $\Delta b$ values representing the difference in color space between the standard and batch panels can be substituted into equation (38) to give the more practical equation (39).

$$\vec{\Delta L} = [V]\vec{\Delta C} \qquad (39)$$

Equation (39) may be used to estimate changes in pigment concentration to effect a color match. This is called "SHADING." However, the elements of the $V$ matrix (Vectors) must be known.

Vectors may be obtained in two ways. They may be estimated experimentally by varying the concentration of the pigments one at a time, and subsequently measuring the new color coordinates by use of a colorimeter. The ratio of the observed change in color coordinates to the change in concentration give the desired vectors.

Alternately, vectors may be calculated by use of the Kubelka-Munk equation and the definition of the color coordinates. For example, $\partial L/\partial C_i$ can be calculated by means of the chain rule as shown by equation (40).

$$\frac{\partial L}{\partial C_i} = \frac{\partial L}{\partial C} \frac{\partial G}{\partial Y} \frac{\partial Y}{\partial R} \frac{\partial R}{\partial R'} \frac{\partial R'}{\partial \delta} \frac{\partial \delta}{\partial C_i} \qquad (40)$$

Application of the chain rule to each of the three color coordinates L, a and b gives equations (41), (42) and (43).

$$\frac{\partial L}{\partial C_i} = \frac{25.29(10K)(\beta-\gamma\alpha)}{3} \sum_{j=1}^{31} \frac{(Hy)_j}{Y^{2/3}} P_j \qquad (41)$$

$$\frac{\partial a}{\partial C_i} = \frac{106(10K)(\beta-\gamma\alpha)}{3} \sum_{j=1}^{31} \left[\frac{1.0216(Hx)_j}{X^{2/3}} - \frac{(Hy)_j}{Y^{2/3}}\right] P_j \qquad (42)$$

$$\frac{\partial b}{\partial C_i} = \frac{42.34(10K)(\beta-\gamma\alpha)}{3} \sum_{j=1}^{31} \left[\frac{(Hy)_j}{Y^{2/3}} - \frac{0.8467(Hz)_j}{Z^{2/3}}\right] P_j \qquad (43)$$

where $$P_j = \left[\frac{R'_j}{(1-R'_j\gamma)^2\sqrt{\delta_j^2+2\delta_j}}\right]\left[\frac{\delta_j S_j - K_j}{\sum_{i=1}^{N} S_i C_i}\right]$$

$j$ indicates one of 31 wave lengths at which R is measured by a spectrophotometer, and $i$ indicates the $i^{th}$ pigment, $i=1, 2...N$.

All of the terms in equations (41), (42) and (43) can be calculated, given the set of K and S values for each of the pigments in the batch.

Assuming that the vectors have bee obtained and that the difference in color coordinates between standard and batch has been calculated, then equation (39) can be solved for the $\Delta C$ vector necessary to effect a color match. However, there are only three color coordinates. Thus, only three pigment composition changes can be calculated. As discussed hereinabove under *Complete Hiding of the Substrate*, if N pigments are present, only N−1 of these are independent. These considerations lead to the following rules for the use of equation (39), depending on the value of N.

1. If N=3, only two pigments can be varied. In this case, no exact color match can be obtained. However, the least squire solution will minimize the sum of the squared deviation between the standard and batch colors. That is, the distance in color space between the standard and batch colors may be minimized. If the matrix, V, contains only the vectors corresponding to the two pigments to be varied, then the solution is given by equation (44).

$$\vec{\Delta C} = [[V]^T[V]]^{-1}[V^T\vec{\Delta L}] \qquad (44)$$

It is immaterial which two pigments are selected.

2. If N=4, then three pigment compositions can be varied and $\Delta C$ is given by equation (45).

$$\vec{\Delta C} = [V]^{-1}\vec{\Delta L} \qquad (45)$$

In this case the MI is invariant. The matrix V contains only the vectors corresponding to the pigments selected. The solution is independent of which three pigments are chosen.

3. If N>4, then there exists (N−1)!/3!BN−4)!combinations of three pigment composition changes that may be calculated by means of equation (45 ). Hence, there are an equivalent number of color matches. Not all of these matches will have the same Metameric Index however. The best color match will have the smallest MI.

In any event, the new concentration vector is $$\vec{C}_{new} = \vec{C}_{old} + \vec{\Delta C} \qquad (46)$$

where $\vec{C}_{old}$ is the current value of $\vec{C}$, and $\vec{\Delta C}$ contains the changes calculated via equations (44) or (45); i.e., $\vec{\Delta C}$ will either have two elements or three elements depending on the number of pigments.

The elements in $\vec{\Delta C}$ are of course added to the corresponding elements in $\vec{C}_{old}$ to obtain $\vec{C}_{new}$. The concentration vector $\vec{C}_{new}$ may be normalized by dividing each element in $\vec{C}_{new}$ by the sum of the elements in $\vec{C}_{new}$.

Of course, the relationship between pigment composition and color coordinates is nonlinear, while equations (44) and (45) are based on linear equation theory as discussed hereinabove under *An Iterative Procedure for Solving Systems of Nonlinear Equations*. Thus, after one application of equation (44) or (45), the new color coordinates for the batch should be calculated. It may be found that the new batch color coordinates are still not the same as the standard coordinates. Thus, equation (41) or (42) must be used repeatedly, each time using the color coordinates and vectors based on the previously predicated pigment concentrations.

If the standard and batch colors are sufficiently close to start with, this iterative procedure will converge; i.e., $\Delta L$, $\Delta a$, and $\Delta b$ will approach zero or constant values with continued iteration. However, if the initial colors are too widely separated, the method may diverge. In this case, the change in concentration vector, $\vec{\Delta C}$, is too large. To avoid divergence, $\vec{\Delta C}$, should be multiplied by a fraction less than one before calculating the new concentration.

The following Table I lists the nomenclature of the equations used in the present specifications and appended claims.

TABLE I

NOMENCLATURE $a$ = color coordinate in L, a, b system
$b$ = color coordinate in L, a, b system
B = color coordinate in G, R, B system
C = fractional composition
D = the total differential of the quantity
F = indicates a functional relationship
G = color coordinate in G, R, B system
$H_x$, $H_y$, $H_z$ = tristimulus values for the standard light sources
K = absorption constant; normalization factor in $x$, $y$, $z$ coordinate system
$k$ = an unknown
L = color coordinate in L, a, b system
MI = metameric index
N = the number of pigments
R = color coordinate in G, R, B system; reflectance data point or reflectance spectra
R' = reflectance spectra in medium of same refractive index as the vehicle of the coating at complete hiding of the substrate
R'' = same as R' except incomplete hiding of substrate
S = scattering constant
[V] = matrix of partial derivatives relating concentration space to color space
X = the red tristimulus coordinate of a standard light source; the pigment weight per unit surface area
[X] = a matrix of independent variable settings
$y$ = a dependent variable
Y = the green tristimulus coordinate of a standard light source Table 1—Continued Z = the blue tristimulus coordinate of a
standard light source Greek Symbols α = 0.005
β = 0.4
λ = wavelength in millimicrons
γ = 0.576
Δ = a difference $\frac{\partial}{\partial}$ = a partial derivative δ = defined by equation (19)

Superscripts

— = a vector
o = a measured value
' = a modified value of the variable superscript
  as defined in the text
T = transpose of the quantity
−1 = the inverse of the quantity Subscripts b = pertaining to the batch
i = pertaining to a pigment
j = pertaining to a dependent variable
p = the number of experimental measurements or settings
g = pertaining to the substrate

PROGRAM OPERATION

FIG. 1 shows a block diagram representation of a computer-aided color formulation process in accordance with the present invention. Following the start 10 of the process, a colorist inspects the color of the standard which is to be matched by a blend of pigments from his library of pigments, and measures the reflectance of the standard color at a plurality of reflectance points. The reflectance values are fed to a computer programmed to select pigments from the colorist's library and to approximate concentrations of the selected pigments to give best match to the reflectance data of the standard color 12.

Signals representative of the selected pigments and concentrations thereof are automatically fed to a program for choosing a subset of the selected pigments 14. Four pigments are preferably initially chosen by the program 14. Alternatively the computer provides a readout to the colorist representative of the selected pigments and the concentrations thereof. The colorist then decides on a number of the selected pigments 13, preferably initially four, for use in the following program 15.

Generally, the program 14 and the colorist decision 13 use those pigments having the greatest approximate concentrations generated by the selection program 12.

In response to signals representative of the measured reflectances and to signals representative of the chosen pigments in program 14 or to the pigments chosen by the colorist 13, a formula program 15 is entered to obtain concentrations of the chosen pigments necessary for a color match under daylight to generate signals representative of the metameric index (MI) of the match. The MI is automatically compared with a predetermined MI tolerance, or the MI is read out to the colorist for comparison with the predetermined MI tolerance 16.

If the metameric index (MI) is unsatisfactory, the program 14 is automatically reentered and another subset of the pigments selected by the selection program 12 are used, if such program selected a number of pigments greater than the number of pigments initially chosen by the program 14.

Alternatively, if the MI is unsatisfactory, the colorist again examines the pigment selection from the program 12 and chooses another subset of the pigments selected by the selection program 12 for input to the formula program 15. The loop including the program 14 and the program 15 or the loop including the colorist decision 13 and the program 15 are repeated until a satisfactory MI match is obtained 16. If the MI is still unsatisfactory after repeating the loop including the program 14 and the program 15 until all subsets of the pigments selected by the selection program have been inputted to the program, it is necessary for the colorist to then exercise human judgement based on his experience 13 to decide on the set of pigments with which to enter the program 15.

When a satisfactory MI match is obtained 16, a blend of pigments is prepared 17 in response to output signals from the program 15 which are representative of the pigments and concentrations thereof for providing a satisfactory MI match.

The difference in color between the standard and the blend 17 is measured by a colorimeter under daylight 18. If the color coordinate differences between the standard and the blend are not within tolerance 19, a program 20 is entered to shade or vary the concentrations of the pigments in the blend 17. This loop is repeated until an acceptable color coordinate differences tolerance is met 19.

When an acceptable color coordinate differences tolerance is obtained 19, the standard and the blend 17 is measured by a colorimeter under incandescent light to obtain a measure of the metameric index (MI). If the MI is not within tolerance, the process returns to program 14 or to the colorist decision step 13, and the process is repeated until a measured acceptable MI tolerance is obtained 22 between the standard and the pigment blend. After an acceptable MI tolerance is obtained 22, the colorist prepares a formula 23 representative of the library pigments and concentrations thereof necessary to provide a color match with the standard, and the process thereafter is ended 24.

It has been experienced that when the formula program 15 computes a color match having a satisfactory metameric index, the verification steps 18, 21 usually confirm the computed value of metamerism within acceptable limits of error. Thus, the verification steps 18, 21 may be eliminated, and production runs carried out based on the pigment concentration values generated by formula program 15. The production blend may then be sampled and measured by a colorimeter under daylight as described with reference to block 18. Errors in pigment concentration may then be corrected by the shade program 20.

A suitable instrument for providing reflectance values in step 11 is a spectrophotometer model 505 manufactured by Bausch and Lomb, Rochester, N.Y. The reflectance values may be automatically punched on paper tape by a Datex encoder manufactured by Datex Corporation in the form of integer numbers between 001 and 999, representing fractional reflectance values between 0.001 and 0.999. The instrument may be operated at a gain of 10, so that reflectances between 001 and 010 may be amplified by a factor of 10. Before running a panel having a standard color thereon on the spectrophotometer, the number of decimal places (either three or four) is punched manually on the tape to identify the gain level. The data representative of reflectance values is than punched automatically by the spectrophotometer at predetermined millimicron intervals between 400 and 700 millimicrons. A suitable interval is 10 millimicrons to provide a total of 31 reflectance points. The reflectance values at the 31 points together with the gain level identification constitute a reflectance spectrum. The reflectance spectrum may be read directly into a computer through a Teletype such as manufactured by Teletype Corporation, Skokie, Ill. A suitable colorimeter for use in measuring color differences 18, 21 is the Colormaster manufactured by Manufacturers Engineering and Equipment Corporation, Warrington, Pa.

The following is a discussion of a specific embodiment described with reference to programs which appear in attached appendices which form part of the present application. The programs are computer listings written in BASIC. A discussion of the BASIC language appears in *BASIC Language: Reference Manual* (711224A), General Electric Company and the trustees of Dartmouth College, 1968. The programs were prepared for a time-sharing service provided by General Electric Company. The service and system commands are described in *Mark II Time-Sharing Service Command System: Reference Manual* (711223), General Electric Company, 1967. A computer suitable for the service is the G.E. 635. Each of the foregoing manuals 711223 and 711224A are incorporated herein by reference.

The first three programs SCATTER, KS1 and KS2 are used to generate absolute pigment constants for all library pigments in a given product line.

As discussed hereinabove with reference to equation (16), the standard pigment is applied to a plurality of experimental panels each at different levels of incomplete hiding of the substrate. A panel is also prepared with the standard white applied at complete hiding of the substrate. The reflectance spectrum of each of the panels is then obtained for use in program SCATTER.

An additional plurality of experimental panels are prepared each having a chemical coating of complete hiding of the substrate and containing a different concentration of a plurality of pigments from the library including the standard pigment. The reflectance spectrum of each of the panels is then obtained for use in programs KS1 and KS2.

PROGRAM SCATTER

The SCATTER program which appears in Appendix II is used to calculate absolute scattering and absorption constants for the standard pigment in a product line which is defined by the vehicle, e.g., alkyl or acrylic. In this program a white pigment, W812, was chosen as the standard pigment. The program uses equations (14), (16), and (17).

For one pigment, equations (16) and (17) reduce to (47) and (48)

$$S = \frac{R'}{X(1-R'^2)} \ln \frac{[R\acute{g}-R'][1-R''R']}{[R\acute{g}R'-1][R'-R'']} \quad (47)$$

$$K = S(1-R')^2/2R' \quad (48)$$

The experimental data are entered into a SDATA file as shown in Appendix I. The reflectance spectrum at complete hiding is entered first, followed by the reflectance spectrum of the substrate. The data at incomplete hiding is entered next, with the weight of pigment per sq. ft. of surface entered immediately after the number of decimal places in each spectrum. The system commands and data entered by the user is underlined.

Execution of program scatter provides the result shown in Appendix III. The user must specify the file name to which K and S values are to be written and the number of panels at incomplete hiding that have been entered for each substrate entered. The program computes the scatter values, at each wavelength, for each panel in the substrate set using equations (14) and (47). At the completion of the calculation, the average S value for all panels in the substrate set is calculated. The program then repeats the calculation for the next substrate set, if there is another. If not, as in the example considered, the program stops when the SDATA file is completely read in.

The program will operate with any number of panels per substrate set, and any number of substrate sets. The program output is the value of S at each wavelength, averaged over all reflectance spectra at incomplete hiding in the SDATA file.

Using the grand average values of S, the program computes the corresponding K values by use of equation (48). After printing these values at the terminal, the program writes the K and S values to the file designated by the user. Appendix IV shows a listing of the W812 file which was written by the program.

PROGRAM KS1

Program KS1 shown in Appendix V provides a more precise measure of the K values of the standard pigment, and a measure of how well a given set of data can be fitted by the Kubelka-Munk theory.

The program will calculate the K values of the standard pigment, and the K and S values for all other pigments in mixtures containing up to six pigments. Up to 40 reflectance spectra may be used in the calculation.

The data are entered into the DATA file as shown in Appendix VI. The concentration data is entered first, for each panel, with the concentration of the standard pigment given first. The corresponding reflectance spectra are then entered in the same order as the concentration data.

Execution of the program is demonstrated is demonstrated in appendix VII. The user is asked for the file name of the pigments, the number of pigments and the number of panels. In the example considered, there are four pigments and 21 panels. The pigment codes of the four pigments used are indicated in Appendix VII.

The calculation proceeds by first obtaining an initial guess of the values of the constants. This is done with the aid of equation (49), which is a rearrangement of equation (17), in a form that is linear in the unknown constants.

$$(1-2R'/(1+R'^2))C_1 = \frac{2R'}{(1+R'^2)S_1} \sum_{i=1}^{N} C_i K_i$$
$$- \left(1 - \frac{2R'}{S_1(1+R'^2)}\right) \sum_{i=1}^{N} C_i S_i$$

(49)

where subscript 1 indicated the standard pigment.

The S values of the standard pigment, $S_1$, the concentration, and the reference data are used to evaluate the left-hand side, and the coefficients of the unknown $K_i$ and $S_i$ in equation (49), at each wavelength.

The least square solution procedure outlined hereinabove under *Iterative Procedure for Solving Systems of Nonlinear Equations* is followed to obtain the least square estimate of the constants. The predicted R are then calculated via use of equations (18) and (14).

The nonlinear least squares procedure outlined hereinabove under iterative procedure is then followed to obtain the least square values of the constants.

The wavelength, the sum of squared deviations and the mean square error are printed out at the terminal. A ? is then printed, to which the user is instructed to reply with a 1 or a 2 depending on the amount of printout desired. Illustrations of the printout for both responses is given in Appendix VII.

The calculation proceeds, wavelength by wavelength, until wavelength 700 is reached, at which time the values of K and S for each pigment are written to files, and execution terminates. The calculated K and S values are shown in Appendix VIII.

PROGRAM KS2

Program KS2 shown in Appendix IX is similar to KS1 with the exception that the K values of the standard pigment are not recalculated. This program is designed to calculate K and S values for all pigments that are to be used in the given product line. In any calculation, up to 40 reflectance spectra may be used, and up to six pigments, including the standard white, may be present on each panel.

The program proceeds by first obtaining the initial estimate of the unknown $K_i$ and $S_i$ with the aid of equation (50).

$$C_1 \left(1 - \frac{2R'}{(1+R'^2)} \left(1 + \frac{K_1}{S_1}\right)\right)$$
$$= \frac{2R'}{(1+R'^2)S_1} \sum_{i=2}^{N} C_i K_i - \left(1 - \frac{2R'}{(1+R'^2)S_1}\right) \sum_{i=2}^{N} C_i S_i$$

(50)

where subscript 1 indicates the standard pigment.

Equation (50) is the same as (49), with the first term in the K summation moved from the right-hand side of the equation to the left-hand side. The concentration and reflectance data are placed in the DATA file as in Appendix VI.

Program execution is illustrated in Appendix X. The user is asked for the number of pigments, the number of panels and the pigment codes of the pigments used in the mixture. The program uses the K and S values of the standard pigment, the concentration, and the reflectance data to evaluate the left-hand side of equation (50) and the coefficients of the unknown $K_i$ and $S_i$. After obtaining the initial estimates of the constants, the program proceeds to calculate the nonlinear least square solutions for the unknown $K_i$ and $S_i$ according to the procedure described hereinabove under the iterative procedure.

Following the calculation at each wavelength, the program prints the wavelength, the sum of squared deviation, and the mean square error between experimental and predicted reflectance. The user may request a more detailed printout at each wavelength by typing a 2 in response to the ? printed after each wavelength calculation.

After completing the calculation at wavelength 700 the program writes the calculated K and S values for each pigment to files bearing the same name as the pigment codes supplied by the user. The pigment constants calculated by KS2 are given in Appendix XI. These results are based on the values of K and S given in Appendix IV, rather than those shown under W812 in Appendix VIII.

The pigment mixtures used in the experimental panels need not contain all the pigments. It is recommended that the mass-tones (single pigment dispersions) of each pigment, except the standard, be included in the experimental panels. The remaining panels may consist of a number of single pigment dispersions let down in the standard, as well as mixtures of all the pigments.

The advantage of being able to evaluate a number of pigment constants simultaneously is to provide pigment constants that fit reflectance data ranging from single pigment dispersions, to mixtures of each pigment in the standard, to mixtures of a number of pigments, and to determine the accuracy of the fit to all these different types of dispersions.

Thus, the absolute K and S values for the library pigments may be determined by executing program SCATTER to generate K and S values of the standard library pigment. Program KS1 is entered with the S values of the standard as determined by program SCATTER and with concentration and measured reflectance data to generate improved K values of the standard pigment and K and S values for up to five nonstandard library pigments. Program KS2 is then entered with the improved K values of the standard pigment from program KS1, the S values of the standard pigment from program SCATTER, the known pigment concentration values, and the measured reflectance data to generate K and S values for the remaining nonstandard library pigments.

Alternatively, program KS2 may be entered directly with the K and S values of the standard library pigment from program SCATTER, the known concentration values, and the measured reflectance values to generate the K and S values for the nonstandard library pigments.

If absolute K and S values are not desired, relative values may be obtained as described hereinabove under *Complete Hiding of the Substrate*.

PROGRAM SELECT

Assuming that the pigments K and S values have been obtained, the problem of selecting pigments from the library to match a given color of unknown composition remains to be solved.

The problem is one of qualitative and quantitative analysis. It is necessary to know which pigments to use and how much of each pigment should be used. The available data consists of the 31 reflectance values of the unknown. This data represents the combined effect of all the pigments (generally 3 to 5) actually present in the panel.

In accordance with an important aspect of the present invention, the measured reflectance values of the unknown or standard panel, to be matched by a blend from the library, are used to select those pigments from the library that best fit these data. This aspect comprises using a linearized form of the Kubelka-Munk equation (17) to arrive at a first estimate of the concentration of pigments in the library necessary to give a best match to the reflectance spectrum of the standard panel.

Examination of equation (50) indicates that if one divides through by the concentration of the standard white, $C_1$, the resulting equation is linear in the concentration ratio $C_i/C_1$ as shown by equation (51).

$$\left(1 - \frac{2R'}{1+R'^2}\left(1+\frac{K_1}{S_1}\right)\right) = \sum_{i=2}^{N}\left[\frac{2R'}{1+R'}\left(\frac{K_i+S_i}{S_1}\right) - \frac{S_i}{S_1}\right]\frac{C_i}{C_1} \quad (51)$$

where $R'$ = the corrected reflectance of the standard at a given wavelength.

$K_1, S_1$ = the absorption and scatter constants of one pigment chosen as the standard (a white pigment is best), at a given wavelength.

$K_i, S_i$ = the absorption and scatter constants of the $i^{th}$ pigment as the library, at a given wavelength.

$N$ = the number of pigments to be considered from our library.

$C_i/C_1$ = the concentration ratio of the $i^{th}$ pigment to the standard pigment in the library.

The reflectance data of the standard panel measured in block 11 of FIG. 1 and the library pigment constants are used to evaluate the left-hand side and the coefficients of $C_i/C_1$ in equation (51) to obtain a first estimate of $C_i/C_1$ via the technique described hereinabove under *Iterative Procedure for Solving Systems of Nonlinear Equations*.

The values of $C_i/C_1$ may be further refined by use of the standard nonlinear least square solution procedure of equations (10) through (13).

Since there are 31 reflectance values per unknown, and there are N−1 independent concentration ratios, up to 32 pigments may be included in the calculation.

A scan of the estimated concentrations of each pigment indicates the relative amount of each pigment. By dropping out all pigments present in amounts less than some small positive value, a number of pigments can be eliminated. The process can be repeated, using only the remaining pigments, until all pigments remaining are present in amounts greater than the amount chosen.

Program SELECT shown in Appendix XIII is based on equation (51) and is designed to perform the scanning and elimination of pigments described above.

The panel code, the product line, the number of decimal places and the panel gloss are punched on paper tape, followed by the 31 reflectance values for the panel. Panel gloss will be discussed hereinafter with reference to program FORMULA. The tapes are then entered in the RDATA file as shown in Appendix XII. All of the K and S values are stored in the select program along with the corresponding pigment codes.

The execution of program SELECT is shown in Appendix XIV. The user is asked for the reflectance set, the tolerance and the number of pigments. The meaning of these terms are:

a. Reflectance Set = the position of the desired panel in RDATA file.

b. Tolerance = the weight fraction composition below which pigments are to be thrown out of the mixture.

c. Number of pigments = the number of pigments to use initially in fitting the reflectance data (the number of pigments are taken in the order in which they are stored in the program).

Program SELECT reads the pertinent data from the RDATA file, prints out the code, the line, the number of decimal places, and the gloss. The program then proceeds to calculate the initial estimate of the pigment concentration ratios and the corresponding weight fraction composition of each pigment according to equations (52) and (53).

$$C_1 = 1 \bigg/ \left(1 + \sum_{i=1}^{N} C_i/C_1\right) \quad (52)$$

$$C_i = \frac{C_i}{C_1}(C_1), \quad i = 2, \ldots N \quad (53)$$

Program SELECT scans the weight fraction concentration, and throws out any pigment present in amounts less than a tolerance specified. The number of pigments under consideration is printed out, along with the pigment codes thrown out. This procedure is repeated as many times as necessary, to arrive at a set of pigments all of whose composition exceed the tolerance, at which time the answer is printed out and the user is asked to specify a new tolerance. If the new tolerance is the same as the original, the program skips to the beginning and asks for the next reflectance set, the tolerance and the number of pigments.

Table II provides an explanation of Program SELECT as presented in Appendix XIII.

TABLE II

| SELECT Line Numbers | Purpose |
|---|---|
| 100–110 | Designates disc file name where the reflectance spectra of the standards are stored and designates that individual data points are separated by blanks. |
| 120–150 | Serve to designate the maximum size of the matrices used in the calculation. |
| 160–180 | Define the values of the constants used in the conversion of $R$ to $R'$ in equation (14). |
| 190 | Read the number 5 which is the number of sets of pigment constants stored in the program—(this causes the value 24 to be read from line 1090). |
| 200–220 | Read the pigment code names stored in lines 1100 through 1130 into the vector PS. |
| 230 | Read all the pigment constants into matrix file read the data beginning on line 1140. |
| 240 | Causes a line feed at the teletypewriter. |
| 250 | Print the statement "Ref. Set, Tolerance, No. of Pig." This alerts the user that certain information will be required as follows: Causes a break in program execution. Program will wait for the values of I T, and N5 to be input by the user. N1 = the position of the reflectance spectrum in the RDATA file, for which a pigment selection is desired. T = the tolerance, or weight fraction concentration, below which pigment are to be dropped. N5 = the number of pigments to consider in the selection (this writes over the value of N5 read initially). |
| 270–300 | Read the heading information and reflectance data from the RDATA file, N1 times. The result is to place the reflectance data of the N1$^{th}$ panel in matrix L. |
| 310 | Move the pointer in file 01 back to the beginning of the file. |
| 320–330 | Give line feed at terminal and print out heading information F5S, Z7, W1, and G1, being the panel code, the product line number, the number of decimal places and the panel gloss respectively. |
| 340 | Move the decimal place, W1 places to the left, for all reflectance data in the spectrum. |
| 342–348 | Correct reflectance data for gloss as per equation (54). |
| 350–370 | Store the integer numbers 1 through N5 in vector Q. |
| 380 | Set iteration counter N to 1. |
| 390–430 | Set matrices to proper size depending on value of 5 |
| 440–450 | Give line feed and print out the number of pigments, 5 currently under consideration. |
| 460–570 | Correct the reflectance data calculate $R'$ from $R$ according to equation (14); calculate the left-hand side of equation (51) and store in vector B; calculate the coefficients of the unknown pigment concentration ratios, $C_i/C_1$, according to equation (51) and store in matrix A. |
| 580–630 | Calculate the unknown $C_i/C_1$ ratios according to the least square solution procedure as described in iteration procedure, and summarized by equation (9). |
| 640 | Set a counter L to 5. |
| 650 | Set a counter M to 1. |
| 660 | Go to subroutine beginning on line 860 and calculate the estimated weight fraction of each pigment, store results in vector W and return to line 670. |
| 670–790 | Scan the elements in vector W, and except the first drop out all pigments present in amounts less than T, except for N801. Test N801 for negative value if iteration counter is > 1; this block of code results in a redefinition of the vector Q, such that Q contains the subscript numbers of the pigments retained by the test. The counter L contains the number of pigments whose subscripts appear in Q. |
| 800 | Increment the iteration counter by 1. |
| 810 | A remark statement summarizing the result of the operations defined by lines 670–790. |
| 820 | Test to see if the number of pigments after the scan (namely L) is the same as the number before the scan. If so, print out the pigment codes and estimated concentrations according to lines 960 through 1010. If not set N5 to L and go to line 390 and repeat the entire calculation for the new number of pigments. |
| 1020–1050 | Set J1 = T, and ask user for new tolerance. |
| 1060–1080 | If new tolerance, T, is same as previous (stored in J1) then go to line 240 and repeat entire procedure for another case. Otherwise, using the new tolerance, return to line 670 and rescan the weight fraction concentrations. |

The results of six trial runs with program SELECT using panels of known composition are given in Table III. These results clearly show that the correct pigmentation is selected, but that several spurious pigments may be retained.

The pigment codes used in Table III refer to commercially available pigments, the specific identification of which are not necessary for understanding the invention. To practice the invention, the pigments in the library must be nonflakelike particles which sufficiently scatter light diffusely to satisfy the second assumption discussed hereinabove under *Kubelka-Munk Analysis*.

TABLE III.—COMPARISON OF SELECTED WITH ACTUAL PIGMENTATION

| Panel No. | Selected | | Actual | |
|---|---|---|---|---|
| | Pigment code | Conc. | Pigment code | Conc. |
| R 11 (20)[1] | W812 | 0.8054 | W812 | 0.8806 |
| | N801 | 0.0149 | N801 | 0.0159 |
| | L807 | 0.0521 | L807 | 0.0617 |
| | G216 | 0.0567 | G216 | 0.0418 |
| | L802 | 0.0362 | | |
| | L806 | 0.0204 | | |
| | Y818 | 0.0144 | | |
| R 22 (20)[1] | W812 | 0.609 | W812 | 0.655 |
| | N801 | 0.0054 | N801 | 0.0049 |
| | Y818 | 0.3704 | Y818 | 0.333 |
| | G216 | 0.00776 | G216 | 0.0065 |
| | Y817 | 0.00727 | | |
| R 33 (15)[1] | N801 | 0.00311 | N801 | 0.0028 |
| | Y818 | 0.2277 | Y818 | 0.232 |
| | Y815 | 0.7196 | Y815 | 0.7651 |
| | W812 | 0.0222 | | |
| | R218 | 0.0274 | | |
| R 44 (20)[1] | W812 | 0.818 | W812 | 0.8542 |
| | N801 | 0.0165 | N801 | 0.0154 |
| | G216 | 0.0339 | G216 | 0.0203 |
| | L806 | 0.0371 | L806 | 0.029 |
| | Y417 | 0.0945 | Y417 | 0.0811 |
| R 55 (24)[1] | W812 | 0.96 | W812 | 0.972 |
| | L807 | 0.00746 | L807 | 0.0058 |
| | Y807 | 0.0127 | Y807 | 0.0104 |
| | Y120 | 0.0199 | Y120 | 0.0126 |
| R 66 (24)[1] | W812 | 0.151 | W812 | 0.102 |
| | N801 | 0.0026 | N801 | 0.0027 |
| | Y815 | 0.111 | Y815 | 0.120 |
| | Y818 | 0.69 | Y818 | 0.776 |
| | Y807 | 0.04 | | |
| | Y417 | 0.0059 | | |

[1] Number of pigments considered in the selection.
[2] W is white, N is a black, L is a blue, G is a green, Y is a yellow, and R is a red.

Extensive tests have shown that one or more subsets of the pigments chosen by the SELECT program will result in a satisfactory color match in about 70 to 80 percent of the cases examined.

Thus program SELECT greatly reduces the prior art need for human judgment to choose the initial pigments.

PROGRAM FORMULA the FORMULA program shown in Appendix XV is designed primarily to compute the pigment composition necessary to obtain a color match, and the metamerism (MI) of the match as described hereinabove with reference to block 15 of FIG. 1. The program has a number of other functions which will be discussed below.

Before discussing the program, a current listing of a typical pigment file is illustrated in Appendix XV. The first 62 values are the K and S values of the pigment. The 63rd value is the pigment cost in $/lb., the 64th value is the pigment density in lb./gal., and the 64th thru 67th value are the weight fraction composition of the pigment in the three tint paste qualities that are currently part of the color matching system.

The input data for FORMULA are entered in the RDATA file as shown in Appendix XII. The data are; the panel code, the product line, the number of decimal places, and the panel gloss, followed by the 31 reflectance values of the standard panel as measured in block 11 of FIG. 1.

All of these data have been discussed previously, with the exception of panel gloss. The color matching system was developed for a gloss level of 95 percent, as determined by a gloss meter. Therefore, any standard submitted must be corrected to the equivalent 95 percent gloss level. This is done thru the use of equation (54).

$$R = R_m - (95-G)(0.028)/100 \quad (54)$$

where
$R_m$ = the measured reflectance
$R$ = the reflectance corrected to the 95 percent gloss level
$G$ = the percent gloss Execution of FORMULA is shown in Appendix XVII. The user is asked first for the starting reflectance set in the RDATA file. The program reads the RDATA file to the desired starting point, and print out the code, line, places and gloss which were read in from the file.

The user is asked for the number of pigments, and the pigment codes that should be used in the calculation. The program reads the pigment files, computes and prints out the (least square) spectral match composition, and the sum of the squared deviation between experimental and predicted reflectance. The program uses equation (51) to obtain the initial estimate of the spectral match composition and then uses the nonlinear least square technique to arrive at the final composition. The compositions are in the same order as the pigment codes supplied.

The program proceeds to compute and print out the color match composition, the corresponding tint paste composition, the Metameric index, and the deviation between predicted and experimental color coordinates in the L, a, b system, under source C and source A. If the color match is perfect the differences in coordinates under source C will be zero. This condition is not desired in practice, since deviations less than $10^{12}$ in color coordinates are not detectable.

The program proceeds to an option point, from which the user may exercise 9 options. These options are:

| Option No. | Meaning |
|---|---|
| 1 | Proceed to the next reflectance set. |
| 2 | Proceed to the next reflectance set but keep the same pigments. |
| 3 | Keep the same reflectance but ask for new pigments. |
| 4 | One more iteration through the color match section of the program. |
| 5 | Calculate and print out vectors. |
| 6 | Calculate hiding information and a load formula. |
| 7 | Print out the reflectance difference for the least square spectral match. |
| 8 | Ask for a new starting reflectance set. |
| 9 | Write out a summary of the calculation to a file. |

The use of the various options are illustrated in Appendix XVII. Options 1, 2, 3 and 8 are self-explanatory.

Option 4 of Appendix XVII illustrates the use of the program to reduce the difference in color coordinates under Source C to a lower value.

Option 5 of Appendix XVII gives an example of the print out for vectors. The row wise order of the vectors is $$\frac{\partial L}{\partial C_i}, \frac{\partial a}{\partial C_i}, \frac{\partial b}{\partial C_i}$$

The vectors are used to shade the match in the laboratory after it is made up and the actual color coordinates are determined. Shading proceeds as described hereinabove under Vectors and Shading with the exception that changes in pigment composition must be positive. It can be shown, that for any pigment mixture at least one set of three vectors will give concentration changes that are all positive.

Option 6 in Appendix XVII shows the input and output information for hiding. The user is asked for the substrate number, the color tolerance, the pigment volume percent (PVC), the dry film thickness (DFT), and the weight fraction solids (WFS) in the wet paint. The significance of these input data are as follows:

Substrate Number
  designates the position, of the reflectance spectrum of the substrate which is to be hidden. These data are placed in a file called SUB.

Color Tolerance
  The square root of the sum of the squared deviations in the color coordinates, L, a, b under Source C between the color at complete and incomplete hiding that is desired.

PVC
  the percent by volume of pigment in the dry paint.

DFT the dry film thickness which is to be used to hide the substrate to the tolerance specified.

WFS the weight fraction of pigment plus resin in the wet paint.

In specifying these input items, the user cannot specify the tolerance, and PVC, and DFT. Only two of these quantities are independent. In order to show which of these three items are to be computed, the user enters a zero for the unknown quantity. An example of the operation of the program is illustrated in Option 6 in Appendix XVII.

ments are kept out for tinting, and to uncontrolled variations from batch to batch.

Pigment additions are computed as described hereinabove under *Vectors and Shading* with the exception that the vectors remain constant for each iteration, and the pigment concentration changes must always be positive because pigments cannot be removed from a batch. As discussed previously, it can be shown that there exists a set of positive composition changes for at least one combination of three pigments.

The following Table IV provides a summary of the functions and limitations of the foregoing programs.

TABLE IV

| Program name | Function | Limitations |
|---|---|---|
| SCATTER | Calculate absolute absorption and scatter constants for the standard pigment. | None. |
| KS1 | Calculate improved values of the absorption constant for the standard pigment using reflectance spectra taken from mixtures of pigments with the standard. | Up to 40 mixtures containing up to 6 pigments. |
| KS2 | Calculate absorption and scatter constants for pigments mixed with the standard pigment. | Do. |
| SELECT | Select pigments from library for use in formulating a color of unknown composition. | Up to 32 pigments may be present in the library (Generally one more than the number of reflectance data points.) |
| FORMULA | Given a set of pigments calculate: <br> 1. The pigment composition necessary to match a color. <br> 2. The metamerism of the match. <br> 3. The pigment volume percent, or the dry film thickness, necessary to hide a surface of known reflectance, and the pigment cost per 100 sq. ft. of surface. <br> 4. Vectors for use in shading laboratory formulations. <br> 5. An initial load formula and the cost of the pigment per gallon of wet paint. | Up to 7 pigments may be used. |
| VECTOR | Given an existing color formulation, calculate: <br> 1. The color coordinates. <br> 2. Correct the formulation to the color coordinates of the standard, if necessary. <br> 3. Calculate tint paste vectors for use in shading plant batches. | Up to 6 pigments may be used. |

Option 7 of Appendix XVII illustrates the print out of the reflectance difference between the batch and standard colors for the spectral match compositions.

Option 9 of Appendix XVII illustrates the operation of the program for writing a summary of the calculation to a file. The user may be matching colors submitted from a variety of locations. By naming files for the submitting locations, the user may write a summary to the appropriate file for later recall and transmission to the submitter. Appendix XVIII shows the output for the two different formats used.

PROGRAM VECTOR

Program VECTOR used to shade in block 20 of FIG. 1 is shown in Appendix XX. The input data to program VECTOR are entered in the VDATA file as shown in Appendix XIX. The code of the color, the line, and the number of pigments are entered, followed by the pigment codes and concentration for each pigment or tint paste present in the formula.

Execution of the program is shown in Appendix XXI. The user is asked for the starting Data set. The corresponding code, line, number of pigments, and the pigment composition are read from the file and printed at the terminal.

The program computes the L, $a$, $b$ coordinates for the color, under source C and asks the user to check the values against the L, $a$, $b$ of the standard. If the L, $a$, $b$ of the formula agree with the standard, the user responds with a "yes" and 1 percent tint paste vectors are printed out. The columnwise order of the vectors is the same as the order of the pigments, and the rowwise order is $\partial L/\partial C_i, \partial a/\partial C_i, \partial b/\partial C_i$. The vectors represent the changes in L, $a$, $b$ coordinates per pound of tint paste, for an infinitesimal addition to a 100 pound batch.

The program output for the case where the L, $a$, $b$ coordinated do not agree with the standard is illustrated in Appendix XXI. In this case the user is asked to supply the L, $a$, $b$ of the standard. The difference in coordinates is then computed by the program, and the output compositions are shaded to the coordinates of the standard. When this process is completed, the vectors are printed out, followed by a revised formula which has the same weight of pigment as the original. This feature of the program is used primarily to bring existing product color formulations into line with the instrumental and computer color program.

Figure 2:
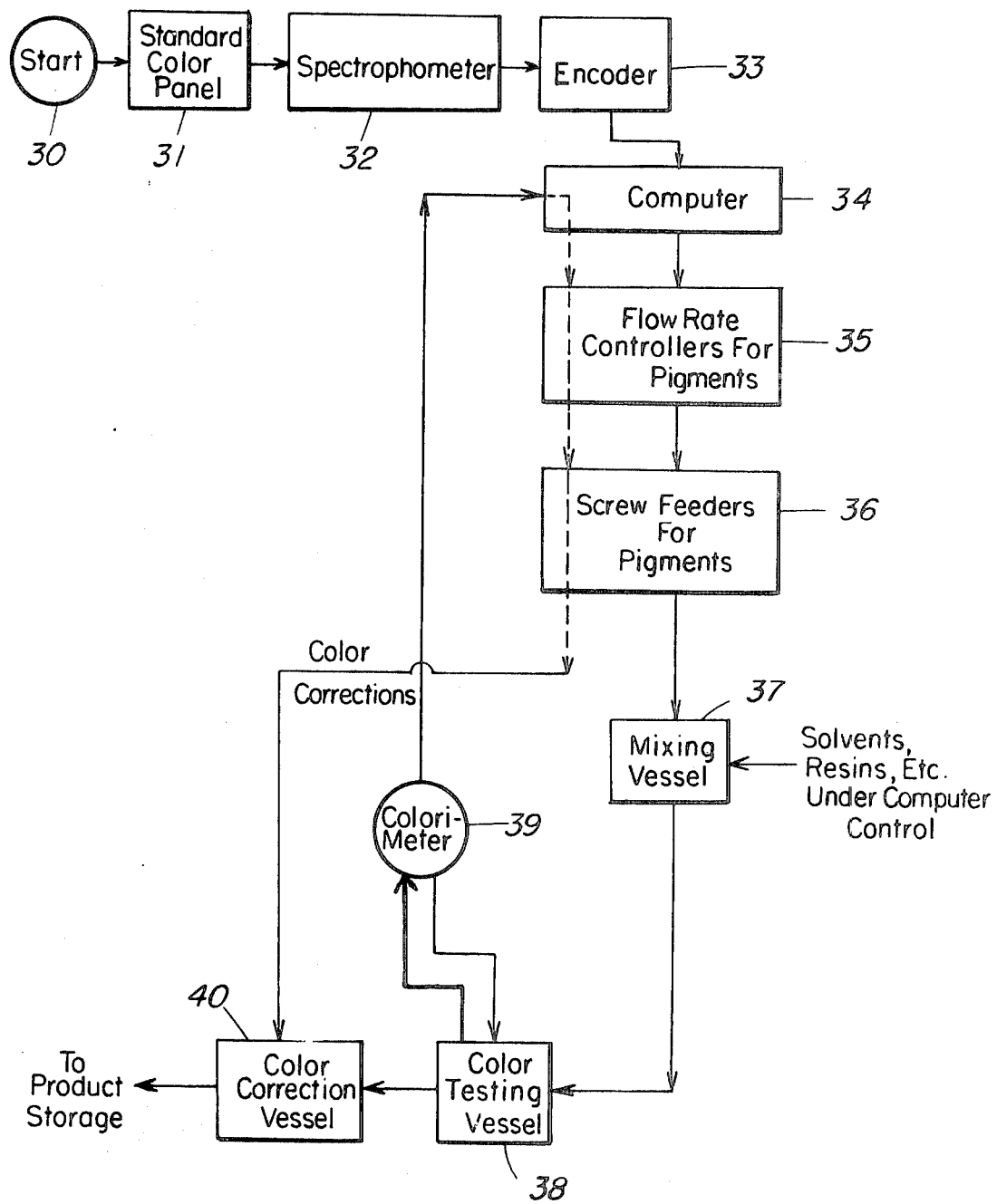
FIG. 2 is a block diagram of a continuous process for blending a chemical coating.

The vectors obtained apply at the L, $a$, and $b$ of the standard. Actual plant batches differ from the standard by significant amounts, due in part to the fact that a portion of the pig- FIG. 2 schematically shows a continuous process for blending a chemical coating. With reference to FIG. 2, at the start 30 of the process a standard color panel 31 is placed in a spectrophotometer 32, e.g., the Bausch and Lomb–505, for determining the reflectance values of the standard. The reflectance values are automatically punched on paper tape by an encoder, e.g., the Datex Encoder. The data on the tape is fed to a computer 34, e.g., the G.E. 635. The connection between the encoder 33 and the computer 34 may comprise a Teletype (not shown) and a telephone line (not shown) as described in *Mark II–Time-Sharing Service: Reference Manual* (711223), General Electric Company, 1967.

The computer 34 executes program SELECT to select library pigments and concentrations thereof to match the reflectance spectrum 32. The computer 34 then performs the routine described with reference to block 14 of FIG. 1 to decide on the initial set of library pigments to be considered. Program FORMULA is then executed, and if necessary the routine of block 14 of FIG. 1 is repeated until an acceptable metameric index is generated.

The computer 34 then generates output signals for adjusting library pigment flow rate controllers 35. The flow rate controllers 35 control screw feeders of tanks of library pigments 36 such that the library pigments flow at rates sufficient to provide concentrations for a color match as generated by program FORMULA.

The library pigments flow to a mixing vessel 37 along with solvents, resins and other components as indicated by the arrow entering at the right side of the mixing vessel 37.

The output stream of the mixing vessel 37 is fed to a testing vessel 38 where the blend is sampled for testing by a colorimeter 39, e.g., the Colormaster, to determine whether the color coordinate difference under daylight between the standard and the blend is within tolerance. If the difference is unsatisfactory, the computer performs a routine including program VECTOR to generate shading output signals shown by the dashed line. The shading signals control adjusts a duplicate set of flow rate controllers as indicated by the dashed line in 35. These controllers control a duplicate set of library pigment screw feeders as indicated by the dashed line in 36. The duplicate set provides a color correction flow of library pigments to a color correction vessel 40 to shade the blend flowing thereto from the color testing vessel 34. The output from the color correction vessel 34 is fed to product storage.

It is also contemplated that a batch process can be carried out in a manner similar to that shown in FIG. 2 with the flow rate signals being replaced by absolute values to pass predetermined amounts of library pigments to a mixing vessel. This vessel is then sequentially sampled for testing by the colorimeter to determine color coordinate difference in daylight and to determine the metameric index.

Figure 3:
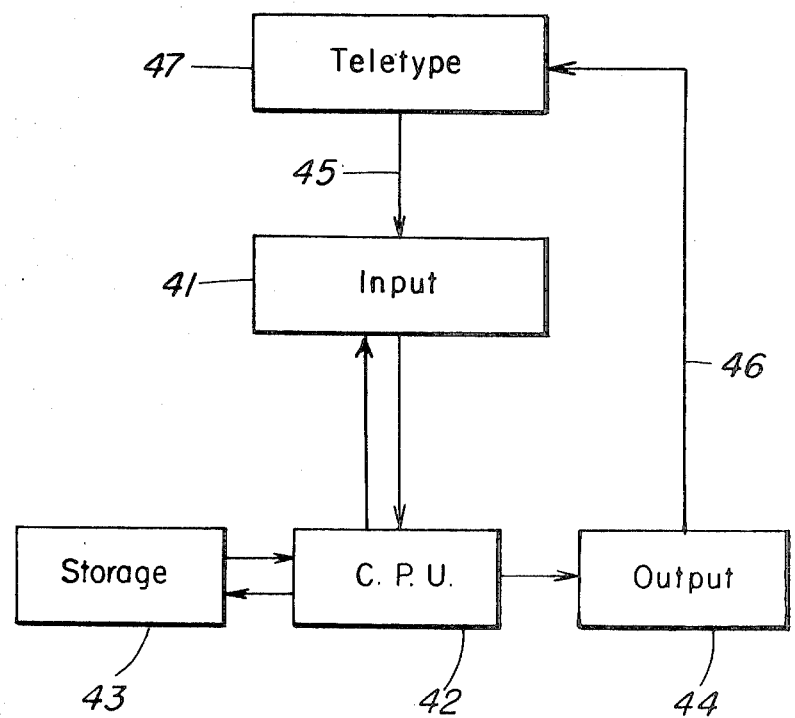
FIG. 3 is a block diagram of a general-purpose digital computer.

A block diagram of the general-purpose digital computer General Electric time-sharing system is illustrated in FIG. 3. The primary computer units are identified as input 41, central processing unit (C.P.U.) 42, storage 43 and output 44.

The input 41 is entered by a Teletype, e.g., Teletype Corporation Model 33ASR, and a telephone line 45. In accordance with the specific embodiments, the Teletype 47 is fed a tape output from an encoder (not shown). In this manner, the teletype 47 receives and transmits data, including measured reflectances and the programs. The input 41 receives the data and programs and transmits them through the central processing unit (C.P.U.) 42 and to the storage 43. The central processing unit 42 processes the data in accordance with the stored programs and transmits a readout to the Teletype 47 via the output 44 and a telephone line 46.

Appendix II (continued)

```
142 PRINT "FILE NAME FOR CONSTANTS";
144 INPUT S1$
146 FILE #2,S1$
148 PRINT
150 REM A=R, B=RGB, C=R INFINITY
160 MAT E=ZER(1,31)
170 READ #1,Z1
180 MAT READ #1,C
190 LET C1=10↑(-Z1)
192 FOR I=1 TO 31
194 LET C2=C1*C(1,I)
196 LET C(1,I)=(C2+C4)/(C3+C4*C5+C5*C2)
198 NEXT I
200 READ #1,Z1
210 IF END #1 THEN 640
220 MAT READ #1,B
230 LET C1=10↑(-Z1)
232 FOR I=1 TO 31
234 LET C2=B(1,I)*C1
236 LET B(1,I)=(C2+C4)/(C3+C4*C5+C5*C2)
238 NEXT I
240 PRINT "NO. OF PANELS IN SUBSTRATE SET";
250 INPUT N1
290 MAT D=ZER(1,31)
300 FOR J=1 TO N1
310 READ #1,Z1,X
320 MAT READ #1,A
330 MAT A=(10↑-Z1)*A
340 PRINT
```

TABLE V.—PROGRAM CHARACTERISTICS SUMMARY FOR GENERAL ELECTRIC MARK II SERVICE

| Program | Primary function of program | Size characters | Maximum number of— | | CPU time [1] | |
|---|---|---|---|---|---|---|
| | | | Pigments | Panels | Compile | Run |
| SCATTER | Calculate absolute scatter and absorption constants for standard pigment | 2,000 | 1 | >100 | 0.16 | 1 |
| KS1 | Recalculate absorption constant of standard pigment and constants for other pigment in mixtures. | 4,000 | 6 | 40 | 0.35 | 55 |
| KS2 | Calculate pigment constants | 4,000 | 6 | 40 | 0.35 | 42 |
| SELECT | Select pigments from pigment library | 18,000 | 32 | ([2]) | 1.70 | 3.8 |
| FORMULA | Calculate pigment composition for color match under Source C | 12,000 | 7 | ([2]) | 1.25 | 5.5 |
| VECTOR | Calculate vectors for use in shading plant batches | 7,000 | 6 | ([2]) | 0.74 | 1.2 |

[1] Typical time (CPU means central processing unit of computer).
[2] Not applicable.

Appendix I

Entering Data in the SDATA File

```
OLD
OLD FILE NAME--SDATA
READY
SCR
READY
TAP
READY
DSM

% 422 692 819 853 865 872 879 803 888 890 895 898
898 898 900 902 903 903 904 908 909 909 909 911 914
915 915 915 917 917 917
4 145 140 134 135 134 134 134 132 130 130
130 131 130 130 130 130 131 130 130 131 131 131
132 132 132 132 132 132 132
3 .00142 426 667 737 709 750 749 706 741 738 735 731
726 720 713 709 704 698 690 686 682 675 669 662
659 652 646 640 634 629 622 616
3 .002703 428 690 793 815 820 822 823 824 824 823 822 821
816 811 809 807 802 796 793 792 786 780 778 775 771
764 759 756 753 747 743
5 .00219 429 688 784 804 808 807 807 807 806 804 801
794 789 786 784 779 772 769 766 761 755 751 748 742
737 731 727 724 718 712
706
READY
REP
READY
```

Appendix II
Program Scatter

```
100 FILES SDATA;W812
110 DELIMIT #1,( )
120 DIM A(1,31),B(1,31),C(1,31),S(1,31)
130 DIM D(1,31),E(1,31)
135 DIM K(1,31)
136 LET C3=.576
137 LET C4=.005
138 LET C5=.4
140 LET N2=0
```

Appendix II (continued)

```
350 PRINT "# OF PIGMENT/ SQUARE FOOT=";X
360 FOR I=1 TO 31
370 LET A(1,I)=(A(1,I)+C4)/(C3+C4*C5+C5*A(1,I))
400 NEXT I
410 FOR I=1 TO 31
420 LET R1=B(1,I)-C(1,I)
430 LET R2=1-A(1,I)*C(1,I)
440 LET R3=B(1,I)*C(1,I)-1
450 LET R4=C(1,I)-A(1,I)
460 LET C=C(1,I)/(X*(1-C(1,I)↑2))
470 LET S(1,I)=C*LOG(R1*R2/(R3*R4))
480 NEXT I
490 PRINT
500 PRINT "S VALUES FOR PANEL";J;"ARE"
510 PRINT
520 MAT PRINT S;
530 MAT D=D+S
540 NEXT J
550 LET N2=N2+N1
560 MAT E=E+D
570 MAT D=(1/N1)*D
580 PRINT
590 PRINT "AVERAGE VALUES OF S IN SET"
600 PRINT
610 MAT PRINT D;
620 PRINT
630 GO TO 200
640 PRINT
650 PRINT "AVERAGE VALUES OF S IN ALL SETS"
660 PRINT
670 MAT E=(1/N2)*E
680 MAT PRINT E;
685 FOR I=1 TO 31
686 LET C1=((1-C(1,I))↑2)/(2*C(1,I))
688 LET K(1,I)=E(1,I)*C1
689 NEXT I
690 PRINT "VALUES OF K ARE"
692 MAT PRINT K;
694 PRINT
696 SCRATCH #2
700 PRINT
702 PRINT "WRITING VALUES OF K AND S TO ";S1$;" FILE"
705 MAT WRITE #2,A;
710 MAT WRITE #2,E;
720 END
```

Appendix III

Execution of Program SCATTER

```
SCATTER      09:59      07/02/69

FILE NAME FOR CONSTANTS? PW812

NO. OF PANELS IN SUBSTRATE SET? 3

OF PIGMENT/ SQUARE FOOT= 0.00142

S VALUES FOR PANEL 1 ARE 2687.27  4542.65  4586.2   3563.67  4571.28  4493.46  3416.4   5004.17
 4107.93  4024.96  3912.18  3788.66  3657.11  3512.19  3429.85  3332.06
 3222.49  3086.34  3020.12  2953.22  2847.1   2747.07  2665.33  2624.36
 2533.31  2459.76  2389.59  2322.07  2266.94  2193.7   2133.36

OF PIGMENT/ SQUARE FOOT= 0.002703

S VALUES FOR PANEL 2 ARE 1284.09  4630.5   4350.9   4528.18  4492.14  4442.05  4358.76  4106.66
 4265.44  4194.74  4094.27  4023.87  3836.1   3665.71  3585.31  3510.9
 3359.53  3198.37  3118.64  3079.45  2938.33  2810.72  2770.26  2706.73
 2625.67  2501.5   2419.71  2372.69  2324.55  2237.75  2182.69

OF PIGMENT/ SQUARE FOOT= 0.00219

S VALUES FOR PANEL 3 ARE 1524.96  4948.3   4717.09  4884.4   4834.65  4662.48  4561.61  8710.22
 4415.71  4318.36  4166.45  3912.59  3760.32  3673.73  3608.85  3468.63
 3294.43  3225.63  3156.26  3041.08  2920.8   2846.09  2792.11  2685.81
 2600.52  2507.26  2448.69  2406.13  2322.57  2245.06  2171.37

AVERAGE VALUES OF S IN SET 1832.11  4707.15  4551.4   4325.42  4632.69  4532.66  4112.26  5940.35
 4263.03  4179.35  4057.63  3908.37  3751.17  3615.54  3541.34  3437.2
 3292.15  3170.11  3098.34  3024.58  2902.08  2801.3   2742.57  2672.3
 2586.5   2489.51  2419.33  2366.96  2304.69  2225.5   2162.47

AVERAGE VALUES OF S IN ALL SETS 1832.11  4707.15  4551.4   4325.42  4632.69  4532.66  4112.26  5940.35
 4263.03  4179.35  4057.63  3908.37  3751.17  3615.54  3541.34  3437.2
 3292.15  3170.11  3098.34  3024.58  2902.08  2801.3   2742.57  2672.3
 2586.5   2489.51  2419.33  2366.96  2304.69  2225.5   2162.47
VALUES OF K ARE 293.796   98.366    20.3063   10.2703   8.40233   6.91507   5.20273   34.002
 4.13347   3.80223   3.12126   2.70084   2.59221   2.49917   2.27151   2.04103
 1.87895   1.8093    1.69838   1.39953   1.28435   1.23975   1.21376   1.07878
 0.902505  0.825555  0.802284  0.784919  0.687671  0.664045  0.645238

WRITING VALUES OF K AND S TO PW812 FILE

USED    1.23 UNITS
```

Appendix IV

Standard White Pigment File Written By SCATTER

```
PW812        09:05      07/01/69

100  293.796 , 98.366 , 20.3063 , 10.2708 , 8.40233 , 6.91507 , 5.20273 ,
110  34.002 , 4.13347 , 3.80223 , 3.12126 , 2.70084 , 2.59221 , 2.49917 ,
120  2.27151 , 2.04103 , 1.87895 , 1.8093 , 1.69838 , 1.39953 , 1.28435 ,
130  1.23975 , 1.21376 , 1.07878 , 0.902505 , 0.825555 , 0.802284 , 0.7 ,
140  0.687671 , 0.664045 , 0.645238 ,
150  1832.11 , 4707.15 , 4551.4 , 4325.42 , 4632.69 , 4532.66 , 4112.26 ,
160  5940.35 , 4263.03 , 4179.35 , 4057.63 , 3908.37 , 3751.17 , 3616.5 ,
170  3541.34 , 3437.2 , 3292.15 , 3170.11 , 3098.34 , 3024.58 , 2902.08 ,
180  2801.3 , 2742.57 , 2672.3 , 2586.5 , 2489.51 , 2419.33 , 2366.96 ,
190  2304.69 , 2225.5 , 2162.47 ,
```

Appendix V
Program KS 1

```
90 REM PROGRAM COMPUTES PIG. CONSTANTS FOR PIG. MIXTURES
92 REM CONTAINING UP TO 6 PIG., USING UP TO 40 PANELS.
94 REM CONSTANTS ARE RELATIVE TO THE SCATTER VALUES OBTAINED
98 REM FROM THE FILE NAMED FIRST BY THE USER.
100 FILES DATA;W812
105 DELIMIT #1,( )
110 DIM A(40,11),B(40,1),C(40,6),D(11,40),E(11,11)
120 DIM F(11,11),G(11,1),H(11,11),I(31,11),M(1,40)
130 DIM P(1,40),R(40,31),T(10,40),U(11,1),X(1,40)
135 DIM K(1,31)
140 PRINT "NO. OF PIG., NO. OF PANELS";
150 INPUT N5,N2
155 REM V2 IS THE WAVE LENGTH COUNTER
160 LET V2 =1
170 REM N1 IS THE NUMBER OF CONSTANTS
180 LET N1=2*N5-1
190 LET C3=.576
200 LET C4=.005
210 LET C5=.4
215 REM C CONTAINS THE CONC. DATA
220 MAT READ #1,C(N2,N5)
221 REM MAT R CONTAINS THE REF. DATA
222 FOR I=1 TO N2
223 READ #1,Z1
224 MAT READ #1,M(1,31)
225 MAT M=(10↑-Z1)*M
226 FOR J=1 TO 31
227 LET R(I,J)=M(1,J)
228 NEXT J
229 NEXT I
240 PRINT
250 PRINT "PIG. CODES(GIVE STANDARD FIRST)";
260 MAT INPUT P$(N5)
265 PRINT
270 FILE #2,P$(1)
275 MAT READ #2,K(1,31)
280 MAT READ #2,S(1,31)
282 MAT K=(10↑-5)*K
285 MAT S=(10↑-5)*S
300 MAT B=ZER(N2,1)
```

Appendix V (continued)

```
310 MAT D=ZER(N1,N2)
320 MAT E=ZER(N1,N1)
330 MAT F=ZER(N1,N1)
340 MAT G=ZER(N1,1)
350 MAT I=ZER(31,N1)
370 MAT T=ZER(1,N2)
380 PRINT "TYPE 1 OR 2 IN RESPONSE TO ?"
390 PRINT "TYPE 1 IF CALC. RESULTS ARE NOT DESIRED"
395 PRINT
400 PRINT "WAVE LENGTH   SUM OF SQUARES   MEAN SQUARE ERROR"
480 MAT U=ZER(10,1)
485 MAT A=ZER(N2,N1)
490 MAT H=ZER(11,N1)
495 REM Y1 IS THE ITERATION COUNTER
500 LET Y1=1
510 GO SUB 2000
520 GO SUB 3000
530 FOR I=1 TO N1
540 LET H(Y1+1,I)=H(Y1,I)+G(I,1)
545 LET G(I,1)=H(Y1+1,I)
550 NEXT I
560 GO SUB 4000
570 IF Y1=1 THEN 610
580 IF U(Y1,1)>U(Y1-1,1) THEN 650
590 IF ABS(U(Y1,1)-U(Y1-1,1))<1E-14 THEN 690
600 IF Y1>=10 THEN 690
610 MAT A=ZER(N2,N1)
620 GO SUB 5000
630 LET Y1=Y1+1
640 GO TO 520
650 FOR I=1 TO N1
660 LET G(I,1)=H(Y1,I)
670 NEXT I
675 LET U(Y1,1)=0
680 GO SUB 4000
690 PRINT 390+10*V2,U(Y1,1),U(Y1,1)/(N2-N1-1),
735 INPUT K8
760 ON K8 GO TO 810,765
765 PRINT
770 PRINT "EXPERIMENTAL R    PREDICTED R"
780 FOR I=1 TO N2
790 PRINT R(I,V2),T(1,I)
800 NEXT I
801 PRINT
802 PRINT "PIG. CODE     K       S"
803 PRINT P$(1);G(1,1)*10↑5;S(1,V2)*10↑5
805 FOR I=2 TO N5
806 PRINT P$(I);G(I,1)*10↑5;G(N5+I-1,1)*10↑5
807 NEXT I
808 PRINT
810 FOR I=1 TO N1
820 LET I(V2,I)=G(I,1)
830 NEXT I
840 IF V2>=31 THEN 880
850 LET V2=V2+1
860 GO TO 480
880 FILE #2,P$(1)
885 MAT I=(10↑5)*I
890 SCRATCH #2
900 FOR I=1 TO 31
910 LET X(1,I)=I(I,1)
920 NEXT I
922 MAT WRITE #2,K;
924 MAT S=(10↑5)*S
925 MAT WRITE #2,S;
950 FOR I=2 TO N5
960 FILE #2,P$(I)
970 SCRATCH #2
980 FOR J=1 TO 31
990 LET X(1,J)=I(J,I)
995 LET S(1,J)=I(J,I+N5-1)
1000 NEXT J
1005 MAT WRITE #2,K;
1007 MAT WRITE #2,S;
1010 NEXT I
1040 GO TO 9000.
2000 REM SUB FOR CALC OF MATRICES FOR INITIAL VALUES OF CONSTANTS
2010 FOR I=1 TO N2
2020 LET P(I,1)=(R(I,V2)+C4)/(C3+C4*C5+C5*R(I,V2))
2030 LET C1=2*P(I,1)/(1+P(I,1)↑2)
2040 LET B(I,1)=(1-C1)*C(I,1)
2050 LET A(I,1)=C1*C(I,1)/S(1,V2)
2060 FOR J=2 TO N5
2070 LET A(I,J)=C1*C(I,J)/S(1,V2)
2080 LET A(I,N5+J-1)=-(1-C1)*C(I,J)/S(1,V2)
2090 NEXT J
2100 NEXT I
2110 RETURN
3000 REM SUB FOR LEAST SQUARE SOLN
3010 MAT D=TRN(A)
3020 MAT E=D*A
3030 MAT F=INV(E)
3040 MAT A=ZER(N1,N2)
3050 MAT A=F*D
3060 MAT G=A*B
3070 RETURN
4000 REM SUB FOR CALC OF R, RPRIME, AND SUM OF SQUARES
4020 FOR I=1 TO N2
4030 LET M1=G(1,1)*C(I,1)
4040 LET M(1,I)=S(1,V2)*C(I,1)
4050 FOR J=2 TO N5
4060 LET M1=M1+G(J,1)*C(I,J)
4070 LET M(1,I)=M(1,I)+G(N5+J-1,1)*C(I,J)
4080 NEXT J
4090 LET X(1,I)=M1/M(1,I)
4095 LET D1=ABS(X(1,I)↑2+2*X(1,I))
4100 LET P(I,1)=X(1,I)+1-SQR(D1)
4110 LET T(1,I)=(P(I,1)*(C3+C4*C5)-C4)/(1-C5*P(I,1))
4120 LET U(Y1,1)=U(Y1,1)+(T(1,I)-R(I,V2))↑2
4130 NEXT I
4140 RETURN
5000 REM SUB FOR CALC. OF MAT. FOR NON LINEAR SOLN.
5010 FOR I=1 TO N2
5020 LET B(I,1)=R(I,V2)-T(1,I)
5025 LET D1=ABS(X(1,I)↑2+2*X(1,I))
5030 LET A1=-P(I,1)/SQR(D1)
5040 LET A2=C3/((1-C5*P(I,1))↑2)
5050 LET A3=1/M(1,I)
5060 LET A4=A1*A2*A3
5070 LET A(I,1)=A4*C(I,1)
5080 FOR J=2 TO N5
5090 LET A(I,J)=A4*C(I,J)
5100 LET A(I,N5+J-1)=-A4*X(1,I)*C(I,J)
5110 NEXT J
5120 NEXT I
5130 RETURN
9000 END
```

Appendix VI
Entering DATA in the DATA File

```
OLD
OLD FILE NAME--DATA
READY
SCR
READY
TAP
READY
DSM
READY
0.041    0.0009   0.906   0.0521
0.0919   0.0009   0.8033  0.1039
0.1426   0.0009   0.7011  0.1554
0.1846   0.0019   0.6049  0.2086
0.2353   0.0018   0.5028  0.2601
0.2624   0.0047   0.4127  0.3202
0.314    0.0047   0.3087  0.3726
0.3654   0.0047   0.2052  0.4247
0.4155   0.0047   0.1023  0.4765
0.0548   0.0099   0.3775  0.5578
0.1004   0.0009   0.2862  0.6125
0.0519   0.0047   0.2042  0.7392
0.0203   0.0028   0.1499  0.827
0.0102   0.0037   0.0511  0.935
0.99917  0.00083  0       0
0.9907   0.0093   0       0
0.9727   0.0273   0       0
0.9222   0.0778   0       0
0.798    0.202    0       0
0.5685   0.4315   0       0
0.1096   0.8904   0       0
3   12  12  13  13  13  13  14  14  14  16  18  19  19  20  20  25  41
87  175 286 391 464 506 527 935 536 537 538 540 538 537
3   20  20  20  20  20  20  20  22  24  27  28  28  28  30  35  52
100 191 303 407 478 517 535 542 544 544 545 547 545 545
3   27  27  27  27  28  28  28  31  34  38  40  40  40  41  47  65
116 209 321 420 486 522 538 545 545 546 547 548 547 545
3   32  32  32  32  33  34  34  36  38  43  48  52  53  52  53  57  75
127 216 312 388 430 452 461 464 463 462 462 462 459 459
3   38  38  38  39  39  41  43  45  48  55  63  66  68  68  68  74  94
150 238 332 402 441 459 465 468 467 467 466 463 463
3   41  40  40  42  42  44  47  49  53  61  71  79  80  81  81  86  104
150 219 276 311 325 332 335 334 333 330 350 329 327 325
3   45  45  45  46  47  51  52  55  64  77  91  104 108 108 109 114
129 177 240 290 316 329 334 336 335 333 331 330 330 327
325
3   52  52  52  54  55  59  62  68  76  95  119 139 146 147 147 153
172 214 268 310 330 337 340 341 340 337 335 335 333 330
329
3   58  59  59  61  65  68  72  79  92  116 155 192 208 212 214 218
233 266 304 328 339 342 343 344 343 340 339 338 336 334
333
3   14  14  14  15  16  17  19  20  26  35  46  54  55  57  56  59  73
104 145 176 191 195 197 198 197 195 193 192 191 189 187
3   19  19  20  20  22  24  27  30  38  50  73  93  100 102 102 107
127 188 283 382 455 495 514 522 524 524 523 523 523 521
520
3   13  13  13  13  16  17  20  25  32  47  70  94  104 106 106 109
126 162 212 251 267 274 275 276 276 273 271 270 268 266
264
3   12  12  12  13  14  16  19  24  32  47  80  115 132 136 137 142
158 203 262 305 328 337 340 341 341 338 335 335 333 331
329
3   11  11  11  12  13  15  19  24  32  51  96  154 192 205 209 213
223 246 270 285 290 292 292 291 288 285 284 282 279 277
276
3   424 592 635 641 644 644 649 652 652 651 650 649 647 645
647 647 645 642 642 642 640 640 640 639 636 634 636 633
630 630 630
3   264 305 312 312 312 312 313 314 313 312 311 310 309 308
307 308 305 303 302 302 299 298 297 295 294 292 293 290
287 286 286
3   155 168 169 170 170 170 170 170 170 168 167 167 166 164
164 163 162 161 160 159 158 157 157 155 154 152 153 151
149 149 148
3   72  75  75  75  74  74  74  74  74  72  72  71  71  70  70  69  68
68  67  67  66  66  65  64  64  63  63  62  62  60  60
4   310 310 310 305 301 299 295 288 284 279 277 275 271 265
262 262 255 252 249 244 243 240 234 230 225 223 224 224
218 215 211
4   161 158 155 151 149 146 144 141 140 135 131 126 121 115
114 112 111 107 105 104 100 98  96  93  90  89  89  85  88  84
76
4   56  56  49  51  50  47  46  43  42  44  45  41  40  36  38  35  33
36  35  34  34  34  29  27  27  25  26  24  25  22  22
READY
REN
READY
```

Appendix VII
Execution of Program KS1

```
OLD
OLD FILE NAME--KS1
READY
RUN

KS1          13:05      07/01/69

NO. OF PIG., NO. OF PANELS? 4,21

PIG. CODES(GIVE STANDARD FIRST)? PW812,PN801,PY818,PY815

TYPE 1 OR 2 IN RESPONSE TO ?
TYPE 1 IF CALC. RESULTS ARE NOT DESIRED

WAVE LENGTH  SUM OF SQUARES   MEAN SQUARE ERROR
    400         1.10721E-5        8.517E-7         ? 1
    410         1.36454E-5        1.04965E-6       ? 1
```

Appendix VII (cont'd.)

```
OLD
OLD FILE NAME--KS1
READY
RUN

KS1          13:05      07/01/69

NO. OF PIG., NO. OF PANELS? 4,21

PIG. CODES(GIVE STANDARD FIRST)? PW812,PN801,PY818,PY815

TYPE 1 OR 2 IN RESPONSE TO ?
TYPE 1 IF CALC. RESULTS ARE NOT DESIRED

WAVE LENGTH  SUM OF SQUARES   MEAN SQUARE ERROR
    420         1.67294E-5        1.28687E-6       ? 1
    430         1.84237E-5        1.41721E-6       ? 1
    440         2.24576E-5        1.72751E-6       ? 1
    450         1.57478E-5        1.21137E-6       ? 1
    460         2.32017E-5        1.78475E-6       ? 1
    470         2.91383E-5        2.24141E-6       ? 1
    480         1.74565E-5        1.34281E-6       ? 1
    490         2.97408E-5        2.28776E-6       ? 1
    500         2.56969E-5        1.97669E-6       ? 1
    510         2.73411E-5        2.10316E-6       ? 1
    520         2.36971E-5        1.82285E-6       ? 1
    530         2.68758E-5        2.06737E-6       ? 1
    540         2.62718E-5        2.02091E-6       ? 1
    550         3.522E-5          2.70923E-6       ? 1
    560         4.72103E-5        3.63157E-6       ? 1
    570         3.43574E-5        2.64287E-6       ? 1
    580         8.20465E-5        6.31127E-6       ? 1
    590         1.20717E-4        9.28592E-6       ? 1
    600         1.75939E-4        1.35338E-5       ? 1
    610         1.72081E-4        1.3237E-5        ? 1
    620         2.01151E-4        1.54732E-5       ? 1
    630         2.34501E-4        1.80386E-5       ? 2
```

Appendix VII (cont'd.)

```
EXPERIMENTAL R   PREDICTED R
   0.527           0.528797
   0.535           0.533506
   0.538           0.538403
   0.461           0.457223
   0.465           0.466842
   0.335           0.334163
   0.336           0.334769
   0.341           0.335392
   0.344           0.336022
   0.198           0.200948
   0.522           0.523163
```

Appendix VII (cont'd.)

| | |
|---|---|
| 0.276 | 0.281647 |
| 0.341 | 0.342552 |
| 0.291 | 0.289006 |
| 0.639 | 0.639742 |
| 0.295 | 0.298426 |
| 0.155 | 0.158711 |
| 0.064 | 6.82074E-2 |
| 0.023 | 2.44655E-2 |
| 0.0093 | 7.20217E-3 |
| 0.0027 | -1.20692E-3 |

| PIG. CODE | X | S |
|---|---|---|
| PW812 | 2.09168 | 2672.3 |
| PN801 | 104559. | 1062.69 |
| PY818 | 58.7286 | 1922.76 |
| PY815 | 1.76444 | 931.152 |

| | | | |
|---|---|---|---|
| 640 | 2.16504E-4 | 1.66542E-5 | ? ⊥ |
| 650 | 2.07055E-4 | 1.59273E-5 | ? ⊥ |
| 660 | 1.79114E-4 | 1.3778E-5 | ? ⊥ |
| 670 | 2.13859E-4 | 1.64507E-5 | ? ⊥ |
| 680 | 2.21923E-4 | 1.70402E-5 | ? ⊥ |
| 690 | 1.96768E-4 | 1.5136E-5 | ? ⊥ |
| 700 | 2.1272E-4 | 1.63631E-5 | ? ⊥ |

USED   54.56 UNITS

Appendix VIII

Pigment Files Written By KS1

PW812        14:24        07/01/69

```
100  233.356 , 88.5016 , 21.7819 , 13.4122 , 10.1849 , 10.0899 , 3.88255,
110  1.6086 , 0.663546 , 0.112677 , 0.303645 , 0.909255 , 2.17769 , 2.9,
120  0.433066 , 0.397121 , 0.84217 , 2.50944 , 3.14491 , 3.46021 , 3.65,
130  2.84029 , 2.36563 , 2.09168 , 3.58583 , 3.5121 , 2.20292 , 3.04768,
140  3.69812 , 2.86515 , 2.53006 ,
150  1832.11 , 4707.15 , 4551.4 , 4325.42 , 4632.69 , 4532.66 , 4112.26,
160  5940.35 , 4263.03 , 4179.35 , 4057.63 , 3908.37 , 3751.17 , 3616.5,
170  3541.34 , 3437.2 , 3292.15 , 3170.11 , 3098.34 , 3024.58 , 2902.08,
180  2801.3 , 2742.57 , 2672.3 , 2586.5 , 2489.51 , 2419.33 , 2366.96 ,
190  2304.69 , 2225.5 , 2162.47 ,
```

PN801        08:53        07/02/69

```
100  67996.6 , 169709. , 163341. , 155282. , 156744. , 162998. , 147591,
110  212386. , 153055. , 151908. , 148524. , 143565. , 138596. , 134819,
120  132786. , 128823. , 125004. , 121481. , 117811. , 114290. , 110987,
130  107909. , 106099. , 104559. , 101893. , 99747.1 , 96719.1 , 95943.2,
140  95012.6 , 92652.7 , 90282. ,
150  2443.25 , 5632.49 , 5068.24 , 4764.02 , 4910.23 , 4643.18 , 4054.29,
160  5417.33 , 3896.52 , 3695.69 , 3571.37 , 3247.45 , 3015.11 , 2700.97,
170  2700.49 , 2409.39 , 2322.48 , 2302.28 , 1926.99 , 1612.79 , 1484.43,
180  1403.17 , 1192.69 , 1062.69 , 959.395 , 965.416 , 976.086 , 896.271,
190  974.305 , 837.459 , 688.48 ,
```

PY818        08:55        07/02/69

```
100  3358.35 , 9165.91 , 9357.76 , 8755.85 , 10397.5 , 9441.65 , 9011.93,
110  13461.5 , 9887.15 , 9525.94 , 9915.12 , 9318.9 , 8934.84 , 8739.59,
120  8517.83 , 7838.35 , 6264.82 , 3637.37 , 1753.93 , 727.022 , 318.884,
130  143.549 , 81.8407 , 58.7286 , 47.3448 , 43.6616 , 36.1605 , 35.3941,
140  34.3053 , 31.3171 , 29.2963 ,
150  133.793 , 385.5 , 434.756 , 392.626 , 410.959 , 419.162 , 415.904 ,
160  601.2 , 473.959 , 492.261 , 612.621 , 576.92 , 547.613 , 555.63 ,
170  573.62 , 677.037 , 955.345 , 1372.66 , 1518.47 , 1925. , 2023.79 ,
180  1925.73 , 1920.24 , 1922.76 , 1864.37 , 1807.91 , 1677.96 , 1680.99,
190  1678.14 , 1583.44 , 1517.05 ,
```

PY815        08:56        07/02/69

```
100  6057.88 , 15778.1 , 15182. , 13757.9 , 13678.7 , 12519.3 , 10734.5,
110  13657. , 7873.04 , 5024.34 , 2200.89 , 671.197 , 137.846 , 8.18757,
120  -61.8137 ,-90.0035 ,-85.0868 ,-80.4178 ,-43.8066 , 6.82978 ,-2.67605,
130  2.07219 , 1.57113 , 1.76444 , 1.38254 ,-0.557352 , 0.726047 ,-0.383,
140  -1.89399 ,-1.25141 ,-1.4594 ,
150  335.791 , 874.516 , 846.921 , 805.352 , 890.105 , 915.209 , 951.395,
160  1513.23 , 1214.81 , 1318.97 , 1458.36 , 1456.07 , 1366.59 , 1316.93,
170  1236.42 , 1156.63 , 1091.92 , 1004.15 , 1014.34 , 1091.77 , 1010.18,
180  986.719 , 953.073 , 931.152 , 892.587 , 846.002 , 815.738 , 797.233,
190  766.49 , 741.69 , 714.189 ,
```

Appendix IX
Program KS 2

```
90  REM PROGRAM COMPUTES PIG. CONSTANTS FOR PIG. MIXTURES
92  REM CONTAINING UP TO 6 PIG., USING UP TO 40 PANELS
94  REM CONSTANTS ARE RELATIVE TO THE SCATTER AND ABSORPTION
98  REM VALUES OBTAINED FROM THE FILE NAMED FIRST BY THE USER
100 FILES DATA:W812
105 DELIMIT #1,( )
110 DIM A(40,1),B(40,1),C(40,6),D(11,40),E(11,11)
120 DIM F(11,11),G(11,1),H(11,11),I(31,11),M(1,40)
130 DIM P(1,40),R(40,31),T(10,40),U(11,1),X(1,40)
135 DIM K(1,31)
140 PRINT "NO. OF PIG., NO. OF PANELS";
150 INPUT N5,N2
155 REM V2 IS THE WAVE LENGTH COUNTER
160 LET V2=1
170 REM N1 IS THE NUMBER OF CONSTANTS
180 LET N1=2*N5-2
190 LET C3=.576
200 LET C4=.005
210 LET C5=.4
215 REM C CONTAINS THE CONC. DATA
220 MAT READ #1,C(N2,N5)
221 REM MAT R CONTAINS THE REF. DATA
222 FOR I=1 TO N2
```

Appendix IX (cont'd.)

```
223 READ #1,Z1
224 MAT READ #1 ,M(1,31)
225 MAT M=(10↑-Z1)*M
226 FOR J=1 TO 31
227 LET R(I,J)=M(1,J)
228 NEXT J
229 NEXT I
240 PRINT
250 PRINT "PIG. CODES(GIVE STANDARD FIRST)";
260 MAT INPUT P$(N5)
265 PRINT
270 FILE #2,P$(1)
275 MAT READ #2,K(1,31)
280 MAT READ #2,S(1,31)
282 MAT K=(10↑-5)*K
285 MAT S=(10↑-5)*S
300 MAT B=ZER(N2,1)
310 MAT D=ZER(N1,N2)
320 MAT E=ZER(N1,N1)
330 MAT F=ZER(N1,N1)
340 MAT G=ZER(N1,1)
350 MAT I=ZER(31,N1)
370 MAT T=ZER(10,N2)
380 PRINT "TYPE 1 OR 2 IN RESPONSE TO ?"
390 PRINT "TYPE 1 IF CALC. RESULTS ARE NOT DESIRED"
395 PRINT
400 PRINT "WAVE LENGTH  SUM OF SQUARES  MEAN SQUARE ERROR"
480 MAT U=ZER(10,1)
485 MAT A=ZER(N2,N1)
490 MAT H=ZER(11,N1)
495 REM Y1 IS THE ITERATION COUNTER
500 LET Y1=1
510 GO SUB 2000
520 GO SUB 3000
530 FOR I=1 TO N1
540 LET H(Y1+1,I)=H(Y1,I)+G(I,1)
545 LET G(I,1)=H(Y1+1,I)
550 NEXT I
560 GO SUB 4000
570 IF Y1=1 THEN 610
580 IF U(Y1,1)>U(Y1-1,1) THEN 650
590 IF ABS(U(Y1,1)-U(Y1-1,1))<1E-14 THEN 690
600 IF Y1>=10 THEN 690
610 MAT A=ZER(N2,N1)
620 GO SUB 5000
630 LET Y1=Y1+1
640 GO TO 520
650 FOR I=1 TO N1
660 LET G(I,1)=H(Y1,I)
670 NEXT I
675 LET U(Y1,1)=0
680 GO SUB 4000
```

Appendix IX (cont'd.)

```
690 PRINT 390+10*V2,U(Y1,1),U(Y1,1)/(N2-M1-1),
735 INPUT K8
760 ON K8 GO TO 810,765
765 PRINT
770 PRINT "EXPERIMENTAL R    PREDICTED R"
780 FOR I=1 TO N2
790 PRINT R(I,V2),T(I,1)
800 NEXT I
801 PRINT
802 PRINT "PIG. CODE     K         S"
805 FOR I=1 TO N5-1
806 PRINT P$(I+1);G(I,1)*10↑5;G(N5+I-1,1)*10↑5
807 NEXT I
808 PRINT
810 FOR I=1 TO N1
820 LET I(V2,I)=G(I,1)
830 NEXT I
840 IF V2>=31 THEN 950
850 LET V2=V2+1
860 GO TO 480
950 MAT I=(10↑5)*I
955 FOR I=1 TO N5-1
960 FILE #2,P$(I+1)
970 SCRATCH #2
980 FOR J=1 TO 31
990 LET K(1,J)=I(J,I)
995 LET S(1,J)=I(J,I+N5-1)
1000 NEXT J
1005 MAT WRITE #2,K;
1007 MAT WRITE #2,S;
1010 NEXT I
1040 GO TO 9000
2000 REM SUB FOR CALC OF MATRICES FOR INITIAL VALUES
     OF CONSTANTS
2010 FOR I=1 TO N2
2020 LET P(1,I)=(R(I,V2)+C4)/(C3+C4*C5+C5*R(I,V2))
2030 LET C1=2*P(1,I)/(1+P(1,I)↑2)
2035 LET C2=1+(K(1,V2)/S(1,V2))
2040 LET B(I,1)=(1-C1*C2)*C(I,1)
2060 FOR J=1 TO N5-1
2070 LET A(I,J)=C1*C(I,J+1)/S(1,V2)
2080 LET A(I,N5+J-1)=-(1-C1)*C(I,J+1)/S(1,V2)
2090 NEXT J
2100 NEXT I
2110 RETURN
3000 REM SUB FOR LEAST SQUARE SOLN
3010 MAT D=TRN(A)
3020 MAT E=D*A
3030 MAT F=INV(E)
3040 MAT A=ZER(N1,N2)
3050 MAT A=F*D
3060 MAT G=A*B
3070 RETURN
4000 REM SUB FOR CALC OF R, RPRIME, AND SUM OF SQUARES
4020 FOR I=1 TO N2
4030 LET M1=K(1,V2)*C(I,1)
4040 LET M(1,I)=S(1,V2)*C(I,1)
4050 FOR J=1 TO N5-1
4060 LET M1=M1+G(J,1)*C(I,J+1)
4070 LET M(1,I)=M(1,I)+G(N5+J-1,1)*C(I,J+1)
4080 NEXT J
4090 LET X(1,I)=M1/M(1,I)
4095 LET D1=ABS(X(1,I)↑2+2*X(1,I))
4100 LET P(1,I)=X(1,I)+1-SQR(D1)
4110 LET T(1,I)=(P(1,I)*(C3+C4*C5)-C4)/(1-C5*P(1,I))
4120 LET U(Y1,1)=U(Y1,1)+(T(1,I)-R(I,V2))↑2
4130 NEXT I
4140 RETURN
5000 REM SUB FOR CALC. OF MAT. FOR NON LINEAR SOLN.
5010 FOR I=1 TO N2
5020 LET B(I,1)=R(I,V2)-T(1,I)
5025 LET D1=ABS(X(1,I)↑2+2*X(1,I))
5030 LET A1=-P(1,I)/SQR(D1)
5040 LET A2=C3/((1-C5*P(1,I))↑2)
5050 LET A3=1/M(1,I)
5060 LET A4=A1*A2*A3
5080 FOR J=1 TO N5-1
5090 LET A(I,J)=A4*C(I,J+1)
5100 LET A(I,N5+J-1)=-A4*X(1,I)*C(I,J+1)
5110 NEXT J
5120 NEXT I
5130 RETURN
9000 END
```

Appendix X

Execution of Program KS2

```
OLD
OLD FILE NAME--KS2
READY
RUN

KS2          09:01     07/02/69

NO. OF PIG., NO. OF PANELS? 4,21

PIG. CODES(GIVE STANDARD FIRST)? PW812,PN801,PY818,PY815

TYPE 1 OR 2 IN RESPONSE TO ?
TYPE 1 IF CALC. RESULTS ARE NOT DESIRED

WAVE LENGTH   SUM OF SQUARES   MEAN SQUARE ERROR
   400          7.50447E-4       5.36034E-5      ? 1
   410          3.58324E-5       2.55945E-6      ? 1
   420          1.75613E-5       1.25438E-6      ? 1
   430          2.28491E-5       1.63208E-6      ? 1
   440          2.37313E-5       1.69509E-6      ? 1
   450          1.99801E-5       1.42715E-6      ? 1
   460          2.41275E-5       1.72339E-6      ? 1
   470          2.93943E-4       2.09959E-5      ? 1
   480          2.35619E-5       1.68299E-6      ? 1
   490          3.68074E-5       2.6291E-6       ? 1
   500          3.00127E-5       2.14376E-6      ? 1
   510          2.9206E-5        2.08615E-6      ? 1
   520          2.38006E-5       1.70005E-6      ? 1
   530          2.70372E-5       1.93123E-6      ? 1
   540          2.85901E-5       2.04215E-6      ? 1
   550          3.71963E-5       2.65688E-6      ? 1
   560          4.80476E-5       3.43197E-6      ? 1
   570          3.47677E-5       2.48341E-6      ? 1
   580          8.39736E-5       5.99812E-6      ? 1
   590          1.24913E-4       8.92239E-6      ? 1
   600          1.81928E-4       1.29949E-5      ? 1
   610          1.74887E-4       1.24919E-5      ? 1
   620          2.02656E-4       1.44754E-5      ? 1
   630          2.35712E-4       1.68366E-5      ? 1
   640          2.25351E-4       1.60965E-5      ? 2

EXPERIMENTAL R    PREDICTED R
  0.535           0.53699
  0.542           0.540862
  0.545           0.544883
  0.464           0.460122
  0.468           0.469153
  0.334           0.334051
  0.335           0.334145
  0.34            0.334248
  0.343           0.334352
  0.197           0.200476
  0.524           0.525556
  0.276           0.280706
  0.341           0.341563
  0.288           0.287184
  0.636           0.639367
  0.294           0.296273
  0.154           0.157097
  0.064           6.74212E-2
  0.0225          2.42673E-2
  0.009           7.27909E-3
  0.0027         -9.85978E-4

PIG. CODE     K          S
PN801      102882.    1131.57
PY818      48.5634    1891.41
PY815      1.45139    901.04

650          2.16346E-4       1.54533E-5      ? 1
   660          1.8134E-4        1.29886E-5      ? 1
   670          2.2104E-4        1.57886E-5      ? 1
   680          2.34419E-4       1.67442E-5      ? 1
   690          2.041E-4         1.45786E-5      ? 1
   700          2.18417E-4       1.56012E-5      ? 1

USED   38.61 UNITS
```

Appendix XI

Pigment Files Written By KS2

```
PN301        09:15       07/02/69

100   61574.7 , 167000. , 153395. , 156520. , 167457. , 164276. , 147059,
110   200713. , 151546. , 150400. , 147364. , 142327. , 138423. , 135025,
120   132019. , 128140. , 124574. , 121762. , 118326. , 114991. , 111841,
130   108437. , 106513. , 104931. , 102882. , 100748. , 97237.5 , 96795.1,
140   96154.5 , 93489.7 , 90997.7 ,
150   1661.62 , 5192.27 , 5152.54 , 4975.44 , 5031.44 , 4859.68 , 3965.1,
160   3557.43 , 3663.86 , 3449.42 , 3382.12 , 3127.47 , 2987.99 , 2734.16,
170   2577.5  , 2300.85 , 2253.31 , 2349.6  , 2011.69 , 1723.84 , 1611.99 ,
180   1488.44 , 1253.86 , 1116.17 , 1131.57 , 1108.48 , 1050.47 , 1016.63,
190   1137.25 , 955.321 , 787.999 ,

PY816        09:23       07/02/69

100   3352.87 , 9166.48 , 9357.53 , 8754.7  , 10397.2 , 9441.57 , 9011.87,
110   13459.8 , 9887.24 , 9527.59 , 9920.37 , 9325.31 , 8936.62 , 8737.27,
120   8526.65 , 7846.12 , 6268.89 , 3636.13 , 1755.33 , 731.324 , 323.292,
130   145.088 , 82.5677 , 59.244  , 48.5634 , 44.8519 , 36.7377 , 36.3221,
140   35.533  , 32.1969 , 30.0385 ,
150   134.055 , 385.871 , 434.668 , 392.355 , 510.842 , 418.993 , 415.965,
160   602.363 , 474.106 , 492.523 , 613.211 , 577.71  , 547.845 , 555.319,
170   574.838 , 678.257 , 956.245 , 1372.17 , 1820.39 , 1938.77 , 2051.21,
180   1942.73 , 1932.09 , 1933.1  , 1891.41 , 1834.91 , 1691.49 , 1703.15,
190   1708.03 , 1604.8  , 1535.07 ,

PY815        09:24       07/02/69

100   6048.24 , 15787.7 , 15179.6 , 13752.3 , 13675.1 , 12512.3 , 10737.6,
110   13727.4 , 7882.8  , 5035.59 , 2209.24 , 675.515 , 138.701 , 7.17937,
120   -58.1453,-86.7591 ,-83.0838 ,-81.5646 ,-43.2847 , 6.52148 ,-3.45208,
130   1.92782 , 1.55646 , 1.77984 , 1.45139 ,-0.502177, 0.760661,-0.323,
140  -1.82926 ,-1.20276 ,-1.42134 ,
150   337.249 , 876.572 , 846.456 , 804.288 , 889.477 , 914.042 , 951.899,
160   1524.12 , 1216.42 , 1321.18 , 1460.81 , 1457.93 , 1367.02 , 1316.45,
170   1238.37 , 1158.36 , 1092.94 , 1003.81 , 1019.72 , 1097.99 , 1015.46,
180   991.242 , 956.583 , 934.34  , 901.04  , 854.273 , 819.994 , 804.114 ,
190   775.51  , 748.234 , 719.709 ,
```

Appendix XII

Entering DATA in the RDATA File

```
OLD
OLD FILE NAME--RDATA
READY
SCR
READY
TAP
READY
DSM
READY

R11 1  3  95
115  135  144  152  161  172  181  187  189  188  184  174  160  142
122  100   80   65   56   51   45   41   40   40   42   44   46   48   48   47   47
R22 1  3  95
 86   91   93   97  103  109  116  126  146  182  242  299  329  338  339
337  329  319  306  288  267  249  240  234  230  228  230  239  247
252  254
R33 1  3  95
  9    9    9   10   11   11   12   14   16   19   23   25   25   25   27   31   47   87  153
240  305  344  362  369  371  370  369  369  368  366  366
R44 1  3  95
119  131  132  134  136  141  147  152  163  170  172  172  174  171
160  143  120   99   84   73   64   57   55   54   54   56   59   62   61   59   54
R55 1  3  95
276  353  383  408  438  469  499  535  573  609  633  638  620  584
538  484  428  386  365  355  345  339  344  358  379  395  405  404
369  371  367
R66 1  3  95
 22   22   23   25   26   29   32   38   49   70  110  153  176  183  186  190
209  249  299  337  356  363  365  366  364  362  359  359  357  355
352
READY
REP
READY
```

Appendix XIII
Program Select

```
100 FILES RDATA
110 DELIMIT #1,( )
120 DIM A(31,23),B(31,1)
130 DIM C(23,31),D(23,23),E(23,23)
140 DIM F(48,32),H(23,1),L(31,1),W(1,24)
150 DIM Q(1,24),P$(24)
160 LET C3=.576
170 LET C4=.005
180 LET C5=.4
190 READ N5
200 FOR I=1 TO N5
210 READ P$(I)
220 NEXT I
230 MAT READ F(2*N5,32)
240 PRINT
250 PRINT "REF. SET, TOLERANCE, NO OF PIG.";
260 INPUT N1,T,N5
270 FOR I=1 TO N1
280   READ #1,F5$,Z7,W1,G1
290 MAT READ #1,L
300 NEXT I
310 RESTORE #1
```

Appendix XIII (cont'd.)

```
320 PRINT
330 PRINT "CODE, LINE, PLACES, GLOSS ";F5$;Z7;W1;G1
340 MAT L=(10↑-W1)*L
342 LET M7=((95-G1)/100)*.028
344 FOR I=1 TO 31
346 LET L(I,1)=L(I,1)-M7
348 NEXT I
350 FOR I=1 TO N5
360 LET Q(1,I)=I
370 NEXT I
380 LET N=1
390 MAT A=ZER(31,N5-1)
400 MAT C=ZER(N5-1,31)
410 MAT D=ZER(N5-1,N5-1)
420 MAT E=ZER(N5-1,N5-1)
430 MAT H=ZER(N5-1,1)
440 PRINT
450 PRINT "NUMBER OF PIG.="; N5
460 FOR I=1 TO 31
470 LET R1=(L(I,1)+C4)/(C3+(C4*C5)+C5*L(I,1))
480 FOR J=2 TO N5
490 LET S=2*Q(1,J)
500 LET K=2*Q(1,J)-1
```

Appendix XIII (cont'd.)

```
510 LET A(I,J-1)=F(S,I)/F(2,I)
520 LET R2=2*R1/(1+R1↑2)
530 LET R2=R2*(F(K,I)+F(S,I))/F(2,I)
540 LET A(I,J-1)=A(I,J-1)-R2
550 NEXT J
560 LET B(I,1)=(2*R1*(F(1,I)+F(2,I))/(F(2,I)*(1+R1↑2)))-1
570 NEXT I
580 MAT C=TRN(A)
590 MAT D=C*A
600 MAT E=INV(D)
610 MAT A=ZER(N5-1,31)
620 MAT A=E*C
630 MAT H=A*B
640 LET L=N5
650 LET M=1
660 GO SUB 860
670 FOR I=2 TO N5
680 IF P$(Q(1,I))="N801" THEN 700
690 GO TO 730
700 IF N=1 THEN 740
710 IF W(1,I)<0 THEN 770
720 GO TO 740
730 IF W(1,I)<T THEN 770
740 LET M=M+1
750 LET Q(1,M)=Q(1,I)
760 GO TO 790
770 LET L=L-1
780 PRINT P$(Q(1,I));" ";
790 NEXT I
800 LET N=N+1
810 REM L=NEW NO. OF PIG. AND SUBSCRIPTS ARE IN Q
820 IF L=N5 THEN 960
830 PRINT "THROWN OUT"
840 LET N5=L
850 GO TO 390
860 MAT W=ZER(1,N5)
870 LET S=0
880 FOR I=1 TO N5-1
890 LET S=S+H(I,1)
900 NEXT I
910 LET W(1,1)=1/(1+S)
920 FOR I=2 TO N5
930 LET W(1,I)=H(I-1,1)*W(1,1)
940 NEXT I
950 RETURN
960 PRINT
970 PRINT "PIG. NO.--------CONC."
980 PRINT P$(1),W(1,1)
990 FOR I=2 TO N5
1000 PRINT P$(Q(1,I)),W(1,I)
1010 NEXT I
1020 LET J1=T
1030 PRINT
1040 PRINT "NEW TOLERANCE=";
1050 INPUT T
1060 IF T=J1 THEN 240
1070 LET M=1
1080 GO TO 670
```

Note: The foregoing program SELECT listing does not include the listing of pigment codes and constants. In a suitable listing line 1090 contains the number of pigments in the library, e.g., 24; lines 1100 to 1130 contain listings of the codes of the pigments in the library; and lines 1140 et seq., contain listings of the library pigment constants.

Appendix XIV

Execution of Program SELECT

```
SELECT      10:10     07/02/69
REF. SET, TOLERANCE, NO OF PIG.? 1,.002,20

CODE, LINE, PLACES, GLOSS R11 1  3  95

NUMBER OF PIG.= 20
Y817  Y815  R218  R806  L218  R816  R815  G807  THROWN OUT

NUMBER OF PIG.= 12
Y266  R801  N804  L164  THROWN OUT

NUMBER OF PIG.= 8

PIG. NO.--------CONC.
W812              0.804221
N801              1.47615E-2
Y818              1.48438E-2
G216              5.71199E-2
L808              5.31187E-3
L807              0.045672
L802              3.71959E-2
L806              2.08741E-2

NEW TOLERANCE=? .006
L808  THROWN OUT

NUMBER OF PIG.= 7

PIG. NO.--------CONC.
W812              0.805392
N801              1.48504E-2
Y818              1.43921E-2
G216              5.66934E-2
L807              5.20675E-2
L802              3.62358E-2
L806              2.03691E-2

NEW TOLERANCE=? .006

REF. SET, TOLERANCE, NO OF PIG.?

USED   5.48 UNITS
```

Appendix XV

Current Listing of Pigment File PW812

```
PW812         09:51     07/02/69

100  233.764 , 88.7535 , 22.2129 , 13.496 , 10.3232 , 8.99178 , 3.95918 ,
110  1.56659 , 0.852406 , 0.598741 , 0.647392 , 0.953601 , 2.3791 , 3.67 ,
120  0.65077 , 0.972815 , 2.06102 , 3.95696 , 4.83668 , 3.68733 , 4.7667 ,
130  3.53275 , 2.92302 , 2.6254 , 4.10985 , 4.00361 , 2.65264 , 3.52452 ,
140  4.15351 , 3.2688 , 2.93873 , 1832.11 , 4707.15 , 4551.4 , 4325.42 ,
150  4632.69 , 4532.06 , 4112.26 , 5940.39 , 4263.03 , 4179.35 , 4057.63 ,
160  3905.37 , 3751.17 , 3616.54 , 3541.34 , 3437.2 , 3292.15 , 3170.11 ,
170  3098.34 , 3024.58 , 2902.08 , 2801.3 , 2742.57 , 2672.3 , 2586.5 ,
180  2489.51 , 2419.33 , 2366.96 , 2304.69 , 2225.5 , 2162.47 , 0.273 ,32.9
190  0.607 , 0.589 , 0.4 .
```

Appendix XVI

Program Formula

```
100 FILES RDATA;W812;SUB;RESULTS;TSV
110 DELIMIT #1,( )
120 DIM A(31,7),B(31,2),C(6,31),D(6,6),E(6,7)
130 DIM F(7,67)
140 DIM G(2,6),H(6,1)
150 DIM 0(1,31)
160 DIM J(2,2),K(6,2),L(31,1),M(6,6)
170 DIM R(6,1),S(20,3),T(1,31)
180 DIM V(6,7),W(1,6),X(31,6)
190 DIM N(5),P(7),Q(40),U(14),Y(5),Z(6)
200 DIM P$(7)
205 RESTORE #1
210 LET K8=0
220 LET Z1=4
230 PRINT "STARTING REFL. SET";
240 INPUT N1
250 FOR I=1 TO N1
260 READ #1,F5$,Z7,W1,G1
270 MAT READ #1,0
280 MAT 0=(10↑-W1)*0
290 NEXT I
300 ON K8+1 GO TO 340,310,310,340
310 READ #1,F5$,Z7,W1,G1
320 MAT READ #1,0
330 MAT 0=(10↑-W1)*0
340 PRINT
350 PRINT"CODE,LINE,PLACES,GLOSS   ";F5$;"   ";Z7;",";W1;",";G1
360 ON K8+1 GO TO 370,370,400,370
370 PRINT
380 PRINT "NO. OF PIG.";
390 INPUT N5
400 PRINT
410 PRINT"PIG. CODES";
420 ON K8+1 GO TO 430,430,440,430
430 MAT INPUT P$(N5)
440 FOR I=1 TO N5
450 ON K8+1 GO TO 460,460,520,460
460 FILE #2,P$(I)
470 MAT READ #2,A(1,67)
480 FOR J=1 TO 67
490 LET F(I,J)=A(1,J)
500 NEXT J
505 IF F(I,64+Z7)<>0 THEN 510
507 LET F(I,64+Z7)=1
510 GO TO 530
520 PRINT P$(I);",";
530 NEXT I
535 LET 05=A2=0
540 MAT L=ZER(31,1)
```

Appendix XVI (cont'd.)

```
550 MAT A=ZER(31,N5-1)
560 MAT C=ZER(N5-1,31)
570 MAT D=ZER(N5-1,N5-1)
580 MAT E=ZER(N5-1,N5-1)
590 MAT H=ZER(N5-1,1)
600 MAT W=ZER(1,N5-1)
610 MAT B=ZER(31,1)
620 MAT M=ZER(6,N5-1)
630 LET X7=0
640 LET C3=.576
650 LET C4=.005
660 LET C5=.4
670 LET K1=1
680 LET Y(1)=Y(2)=Y(3)=Y(5)=Y(4)=0.0
685 LET M7=((95-G1)/100)*0.028
690 FOR I=1 TO 31
700 LET L(I,1)=B(I,1)-M7
710 LET R1=(L(I,1)+C4)/(C3+(C4*C5)+C5*L(I,1))
720 FOR J=2 TO N5
730 LET S=I+31
740 LET A(I,J-1)=F(J,S)/F(I,S)
750 LET R2=2*R1/(1+R1↑2)
760 LET R2=R2*(F(J,I)+F(J,S))/F(I,S)
770 LET A(I,J-1)=A(I,J-1)-R2
780 NEXT J
790 LET B(I,1)=(2*R1*(F(I,I)+F(I,S))/(F(I,S)*(1+R1↑2)))-1
800 NEXT I
810 MAT C=TRN(A)
820 MAT D=C*A
830 MAT E=INV(D)
840 MAT A=ZER(N5-1,31)
850 MAT A=E*C
860 MAT H=A*B
870 MAT W=TRN(H)
880 LET N(K1)=0
890 FOR J9= 1 TO N5-1
900 LET M(K1+1,J9)=M(K1,J9)+W(1,J9)
910 LET W(1,J9)=M(K1+1,J9)
920 LET N(K1)=M(K1+1,J9) + N(K1)
930 NEXT J9
940 LET U(1)=1/(1+N(K1))
950 FOR I=2 TO N5
960 LET U(I)=M(K1+1,I-1)*U(1)
970 NEXT I
980 GO SUB 1010
990 GO TO 1170
1000 REM SUB FOR R,R', SUM XC, SUM SC
1010 FOR I=1 TO 31
1020 LET N1=N2=0
1030 FOR J=1 TO N5
1040 LET S=I+31
1050 LET N1=U(J)*F(J,I)+N1
1060 LET N2=U(J)*F(J,S)+N2
1070 NEXT J
1080 LET X(I,4)=N1
1090 LET X(I,5)=N2
1100 LET X1=N1/N2
1110 LET D9=X1↑2+2*X1
1120 LET X(I,6)=X1+1-SQR(D9)
1130 IF D9>=0 THEN 1140
1131 IF 05=1 THEN 1140
1132 PRINT"CONTINUE  OR  OPTION";
1134 INPUT X$
1136 IF X$="OPTION" THEN 4780
1137 LET 05=1
1138 GO TO 1140
1140 LET T(I,1)=((C3+C4*C5)*X(I,6)-C4)/(1-C5*X(I,6))
1150 NEXT I
1160 RETURN
1170 MAT A=ZER(31,N5-1)
1180 FOR I=1 TO 31
1190 LET X(I,K1)=L(I,1)-T(I,1)
1200 LET Y(K1)=Y(K1)+X(I,K1)↑2
1210 LET X=X(I,4)/X(I,5)
1220 LET X1=SQR(X↑2+2*X)
1230 FOR J=2 TO N5
1240 LET S=I+31
1250 LET N=F(J,S)*(1+X(I,6)↑2)-2*X(I,6)*(F(J,I)+F(J,S))
1260 LET D=X1*X(I,5)/U(1)
1270 LET A(I,J-1)=(N/D)*C3/((1-X(I,6)*C5)↑2)
1280 NEXT J
1290 LET B(I,1)=L(I,1)-T(I,1)
1300 NEXT I
1310 LET L1=3
1320 IF K1=1 THEN 1360
1330 IF (Y(K1-1)-Y(K1))<1.E-12 THEN 1390
1340 IF (Y(K1)-Y(K1-1))>0 THEN 1380
1350 IF K1>=L1 THEN 1390
1360 LET K1=K1+1
1370 GO TO 810
1380 LET K1=K1-1
1390 MAT B=ZER(31,2)
1400 FOR I=1 TO 31
1410 LET B(I,2)=L(I,1)
1420 NEXT I
1430 LET P(1)=1/(1+N(K1))
1440 FOR I=2 TO N5
1450 LET P(I)=M(K1+1,I-1)*P(1)
1460 NEXT I
1470 PRINT
1480 PRINT "SPECTRAL MATCH CONC."
1490 PRINT
1500 FOR S6=1 TO N5
1510 PRINT INT(P(S6)*10↑5+.5)/10↑5;
1520 NEXT S6
1530 PRINT
1540 PRINT
1550 PRINT"SUM OF SQUARES";
1560 PRINT TAB(25);Y(K1)
1570 IF Y(K1)>.2 THEN 4780
1580 GO TO 1690
1590 PRINT
1600 PRINT "REF. DIFF."
1610 PRINT
1620 PRINT "BATCH-STANDARD"
1630 LET J=400
1640 FOR I= 1TO 31
1650 PRINT J;INT(X(I,K1)*10↑3+.5)/10↑3
1660 LET J=J+10
1670 NEXT I
1680 GO TO 4780
1690 LET Z9=0
1700 MAT D=ZER(6,2)
1710 MAT G=ZER(6,2)
1720 MAT H=ZER(1,6)
1730 MAT A=ZER(31,N5)
1740 MAT E=ZER(6,N5)
1750 MAT V=ZER(6,N5)
1760 MAT L=ZER(2,6)
1770 RESTORE #5
1780 LET Z9=Z9+1
1790 MAT READ #5,C(6,31)
1800 MAT A=ZER(31,N5)
1810 FOR J=1 TO N5
1820 LET U(J)=P(J)
1830 NEXT J
1840 GO SUB 1010
1850 FOR I=1 TO 31
1860 LET B(I,1)=T(I,1)
1870 LET X1=X(I,4)/X(I,5)
1880 LET S1=X(I,6)*C5
1890 LET N4=(1/((1-S1)↑2))*(1-((X1+1)/(SQR(X1↑2+2.*X1))))
1900 LET N1=X(I,4)
1910 LET N2=X(I,5)
1920 FOR J=1 TO N5
1930 LET S=I+31
1940 LET N6=(N2*F(J,I)-N1*F(J,S))/N2↑2
1950 LET A(I,J)=N4*N6
1960 NEXT J
1970 NEXTI
1980 LET Y(1)=.100079
1990 LET Y(2)=.100027
2000 LET K2=1
2010 GO TO 2960
2020 LET K2=0
2030 MAT E=C*A
2040 LET I=1
2050 LET P1=1
2060 FOR J7= 1TO 2
2070 LET Y1=(25.29/3)*10*Y(J7)*(.578-.002)
2080 LET Y2=(106/3)*10*Y(J7)*(.578-.002)
2090 LET Y3=(42.34/3)*10*Y(J7)*(.578-.002)
2100 FOR J6= 1 TO N5
2110 LET V(I,J6)=Y1*(1/(G(P1,1)↑(2/3)))*E(I+1,J6)
2120 LET V(I+1,J6)=(1/(G(P1,2)↑(2/3)))*(1.0216*E(I,J6)
         -.00122*E(I+2,J6))
2130 LET V(I+1,J6)=Y2*(V(I+1,J6)-(1/(G(P1,1)↑(2/3)))
         *E(I+1,J6))
2140 LET V(I+2,J6)=(1/(G(P1,1)↑(2/3)))*E(I+1,J6)
2150 LET V(I+2,J6)=Y3*(V(I+2,J6)-(1/(G(P1,3)↑(2/3)))
         *.8467*E(I+2,J6))
2160 NEXT J6
2170 LET I=I+3
2180 LET P1=P1+1
2190 NEXT J7
2200 IF K7=1 THEN 3890
2210 MAT R=ZER(3,1)
2220 LET R(1,1)=L(2,4)-L(2,1)
2230 LET R(2,1)=L(2,5)-L(2,2)
2240 LET R(3,1)=L(2,6)-L(2,3)
2250 IF N5>3 THEN 2280
2260 MAT A=ZER(3,2)
2270 GO TO 2300
2280 MAT A=ZER(3,3)
2290 IF N5>4 THEN 2360
2300 FOR I= 1TO N5-1
2310 LET A(1,I)=V(4,I+1)
2320 LET A(2,I)=V(5,I+1)
2330 LET A(3,I)=V(6,I+1)
2340 NEXT I
2350 GO TO 2610
2360 IF N5>5 THEN 2450
2370 MAT S=ZER(4,3)
2380 FOR L1=1 TO 4
2390 FOR L2= 1TO 3
2400 READ#5,S(L1,L2)
2410 NEXT L2
2420 GO SUB 2530
2430 NEXT L1
2440 GO TO 3400
2450 MAT S=ZER(20,3)
2460 FOR L1=1 TO 10*(N5-5)
2470 FOR L2= 1TO 3
2480 READ #5,S(L1,L2)
2490 NEXT L2
2500 GO SUB 2530
2510 NEXT L1
2520 GO TO 3400
2530 LET Q(1)=S(L1,1)
2540 LET Q(2)=S(L1,2)
2550 LET Q(3)=S(L1,3)
2560 FOR A1= 1TO 3
2570 LET A(1,A1)=V(4,Q(A1))
2580 LET A(2,A1)=V(5,Q(A1))
2590 LET A(3,A1)=V(6,Q(A1))
2600 NEXT A1
2610 IF N5>3 THEN 2670
2620 MAT W=TRN(A)
2630 MAT J=W*A
2640 MAT E=INV(J)
```

Appendix XVI (cont'd.)

```
2650 MAT M=E*W
2660 GO TO 2680
2670 MAT M=INV(A)
2680 MAT H=M*R
2690 LET C1=10↑(.01245*R(1,1))
2700 MAT H=(C1)*H
2710 LET P4=0
2720 IF N5>4 THEN 2800
2730 FOR J8=2 TO N5
2740 LET U(J8)=P(J8)+H(J8-1,1)
2750 LET P4=P4+U(J8)
2760 NEXT J8
2770 LET P4=P4+P(1)
2780 LET U(1)=P(1)
2790 GO TO 2890
2800 FOR J8=1TO N5
2810 LET U(J8)=P(J8)
2820 NEXT J8
2830 FOR A1= 1TO 3
2840 LET U(Q(A1))=P(Q(A1))+H(A1,1)
2850 NEXT A1
2860 FOR J8= 1TO N5
2870 LET P4=P4+U(J8)
2880 NEXT J8
2890 FOR I=1 TO N5
2900 LET U(I)=U(I)/P4
2910 NEXT I
2920 GO SUB 1010
2930 FOR I= 1 TO 31
2940 LET B(I,1)=T(I,1)
2950 NEXT I
2960 MAT K=C*B
2970 LET I=1
2980 FOR J5= 1 TO 2
2990 MAT D=(10*Y(J5))*K
3000 LET G(J5,1)=D(I+1,1)
3010 LET G(J5,2)=.8*(1.277*D(I,1)-.2132*D(I+2,1))
                +.2*.8467*D(I+2,1)
3020 LET G(J5,3)=.8467*D(I+2,1)
3030 LET G(J5,4)=D(I+1,2)
3040 LET G(J5,5)=.8*(1.277*D(I,2)-.2132*D(I+2,2))
                +.2*.8467*D(I+2,2)
3050 LET G(J5,6)=.8467*D(I+2,2)
3060 LET L(J5,1)=25.29*((G(J5,1)↑(1/3)))-18.38
3070 LET L(J5,2)=106*((G(J5,2)↑(1/3))-G(J5,1)↑(1/3))
3080 LET L(J5,3)=42.34*(G(J5,1)↑(1/3)-G(J5,3)↑(1/3))
3090 LET L(J5,4)=25.29*((G(J5,4)↑(1/3)))-18.38
3100 LET L(J5,5)=106*((G(J5,5)↑(1/3))-G(J5,4)↑(1/3))
3110 LET L(J5,6)=42.34*(G(J5,4)↑(1/3)-G(J5,6)↑(1/3))
3120 LET I=I+3
3130 NEXT J5
3135 IF A2=1 THEN 4600
3140 IF K2=1 THEN 2020
3150 LET J5=1
3160 FOR I= 1TO 2
3170 LET Z(J5)=L(I,1)-L(I,4)
3180 LET Z(J5+1)=L(I,2)-L(I,5)
3190 LET Z(J5+2)=L(I,3)-L(I,6)
3200 LET J5=J5+3
3210 NEXT I
3220 LET M7=SQR((Z(1)-Z(4))↑2+(Z(2)-Z(5))↑2+(Z(3)-Z(6))↑2)
3230 IF N5>4 THEN 3250
3240 GO TO 3280
3250 IF L1 <2 THEN 3280
3260 IF (M7-M8)<0 THEN 3280
3270 RETURN
3280 LET M8=M7
3290 FOR I= 1 TO N5
3300 LET Q(4+I)=U(I)
3310 NEXT I
3320 LET Q(12)=Z(4)
3330 LET Q(13)=Z(5)
3340 LET Q(14)=Z(6)
3350 LET Q(15)=Z(1)
3360 LET Q(16)=Z(2)
3370 LET Q(17)=Z(3)
3380 IF N5<5 THEN 3400
3390 RETURN
3400 LET E1=SQR(Q(12)↑2+Q(13)↑2+Q(14)↑2)
3410 IF E1<=1.E-3 THEN 3470
3420 IF Z9>=Z1 THEN 3470
3430 FOR I=1 TO N5
3440 LET P(I)=Q(I+4)
3450 NEXT I
3460 GO TO 1700
3470 PRINT
3480 PRINT "COLOR MATCH CONC."
3490 PRINT
3500 FOR I= 1TO N5
3510 LET P(I)=Q(I+4)
3520 PRINT INT(Q(4+I)*10↑5+.5)/10↑5;
3530 NEXT I
3540 PRINT
3550 PRINT
3560 PRINT "% TINT PASTE"
3570 PRINT
3580 LET P4=0
3590 FOR I=1 TO N5
3600 IF F(I,64+Z7)<>1 THEN 3610
3605 PRINT P$(I);"    NOT IN LINE - USING PURE PIG "
3610 LET R9=F(I,64+Z7)
3620 LET P(I)=P(I)/R9
3630 LET P4=P4+P(I)
3680 NEXT I
3690 FOR I=1 TO N5
3700 LET P(I)=P(I)*100/P4
3705 LET U(I+7)=P(I)/100
3710 REM P(I) IS NOW % TINT PASTE
3720 PRINT P(I);
3725 LET Q(I+20)=P(I)
3730 LET R9=F(I,64+Z7)
3760 LET P(I)=P(I)*R9
3770 REM P(I) IS NOW THE 0 PIG IN 100 OF TOTAL TINTPASTE
3780 NEXT I
3790 PRINT
3800 PRINT
3810 PRINT "M.I.=";M8
3820 PRINT
3830 PRINT "DELTA C=    ";Q(12);Q(13);Q(14)
3840 PRINT "DELTA A=    ";Q(15);Q(16);Q(17)
3850 GO TO 4780
3860 LET K7=1
3870 PRINT
3880 GO TO 1800
3890 PRINT " 1% MACHINE LINE VECTORS-SOURCE C"
3900 PRINT
3910 FOR J=4 TO 6
3920 FOR I=1 TO N5
3930 LET R9=F(I,64+Z7)
3960 PRINT INT(V(J,I)*R9*10↑4+.5)/10↑4;
3970 NEXT I
3980 PRINT
3990 NEXT J
4000 GO TO 4780
4010 FOR I=1 TO N5
4020 LET U(I)=Q(I+4)
4030 NEXT I
4040 GO SUB 1010
4320 PRINT
4330 PRINT"SUB,TOL,PVC,DFT,WFS";
4340 INPUT N4,N1,N2,N3,N6
4350 FOR I=1 TO N4
4360 MAT READ #3,0
4370 NEXT I
4380 RESTORE #3
4390 LET P1=D1=0
4400 FOR I=1 TO N5
4410 LET P1=U(I)*F(I,63) +P1
4420 LET D1=D1 +U(I)/F(I,64)
4430 NEXT I
4435 LET P5=P1/D1
4440 LET D1=1/(D1*231.)
4450 LET Z(1)=(N2/100)*(N3/1000)*D1*144
4460 IF Z(1)>0 THEN 4480
4470 LET Z(1)=.0005
4480 LET Z(2)=Z(1)*1.1
4490 FOR J=1 TO 2
4500 FOR I=1 TO 31
4510 LET R3=X(I,6)
4520 LET R2=O(I,1)-X(I,6)
4530 LET R1=O(I,1)*R3-1
4540 LET S=X(I,5)*1E5
4545 LET C9=S*Z(J)*(1-R3↑2)/R3
4546 IF C9<80 THEN 4550
4547 LET E=0
4548 GO TO 4560
4550 LET E=EXP(-C9)
4560 LET B(I,1)=R3*(1-E)/(1-(R3↑2)*E)
4565 LET B(I,1)=((C3+C4*C5)*B(I,1)-C4)/(1-C5*X(I,6))
4570 LET B(I,2)=(R1+R3-R2*E)/(R1-R3*R2*E)
4572 LET B(I,2)=((C3+C4*C5)*B(I,2)-C4)/(1-C5*X(I,6))
4575 IF N4=1 THEN 4580
4577 LET B(I,1)=T(I,1)
4580 NEXT I
4590 LET A2=1
4595 GO TO 2960
4600 LETQ(J)=((L(2,1)-L(2,4))↑2+(L(2,2)-L(2,5))
              ↑2+((L(2,3)-L(2,6))↑2))↑.5
4630 NEXT J
4640 IF N1=0 THEN 4680
4650 IF ABS(Q(1)-N1)<=1E-3 THEN 4680
4660 LET Z(1)=Z(1)+(N1-Q(1))*(Z(2)-Z(1))/(Q(2)-Q(1))
4670 GO TO 4480
4680 PRINT"COLOR DIFFERENCE    =";INT(Q(1)*10↑3+.5)/10↑3
4690 LET P3=Z(1)*P1*100
4700 LET P2=1000*Z(1)/(D1*144)
4710 IF N3<>0 THEN 4730
4720 LET N3=P2*100/N2
4730 PRINT"DRY FILM THICKNESS  =";N3;"    MILS"
4735 LET Q(39)=N6
4740 IF N2<> 0 THEN 4760
4750 LET N2=(P2/N3)*100
4760 PRINT"PVC                 =";N2
4765 LET Q(37)=N2
4770 PRINT"WEIGHT FRAC  SOLID  =";N6
4771 LET P6=((100/N2)-1)*8+(D1*231)
4772 LET P7=(((P6/N6)-P6)/7)+(100/N2)
4773 PRINT"PIGMENT    COST     =";P5/P7;"    $/GAL"
4774 PRINT"PIGMENT    COST     =";P3;"    $/100 SQ.FT"
4775 LET Q(38)=N3
4776 LET Q(40)=P5/P7
4777 GO SUB 4850
4778 LET A2=0
4780 PRINT
4790 PRINT "OPTION";
4800 INPUT K8
4810 ON K8 GO TO 300,300,300,1700,3860,4010,1590,205,
          5100,9000
4820 REM OPTIONS  1:NEXT CASE; 2=NEW REF. ONLY;
                  3=NEW PIG. ONLY
4830 REM 4= ANOTHER HIT; 5= VECTORS; 6=HIDING
4840 REM 7=REF.DIFF;8=STARTING SET.
4850 REM SUBROUTINE FOR CALCULATION OF LOAD FORMULA
             ASSUMING 50%
4851 REM SOLIDS IN CLEAR,8#/GAL DENSITY OF ALL RESINS,
     AND 80% SOLIDS
4852 REM IN ALL TINT PASTES.
4855 LET X1=0
```

Appendix XVI (cont'd.)

```
4860 FOR I=1 TO N5
4870 LET X1=X1+F(I,64+Z7)*U(I+7)
4880 NEXT I
4885 REM X1= # PIG/#  TINT PASTE MIXTURE
4890 LET Z(I)=Z(I)/144
4895 REM BASIS FOR LOAD FORMULA IS ONE SQ. INCH OF SURFACE.
4900 LET R1=((0.8-X1)/X1)*Z(I)
4910 LET S1=(0.2/X1)*Z(I)
4920 LET V1=R1/(8/231)
4930 LET R2=((N3/1000)-V1-(P2/1000))*8/231
4940 LET S2=R2
4950 LET S3=((1-N6)/N6)*(Z(I)+R1+R2)-S1-S2
4955 REM R1,R2,Z(I),S1,S2,AND S3 ARE ALL WEIGHTS
     PER SQ.INCH OF SURFACE
4960 LET X2=S1+S2+S3+R1+R2+Z(I)
4970 PRINT
4980 PRINT"LOAD FORMULA IN WEIGHT %"
4990 PRINT
5000 PRINT"ZTINT PASTE LINE";Z7
5010 FOR I=1 TO N5
5020 PRINT"       ";PS(I);"       =";(Z(I)/X2)*100*U(I+7)/X1
5025 LET Q(I+27)=(Z(I)/X2)*100*U(I+7)/X1
5030 NEXT I
5040 PRINT"CLEAR AT 50 % SOLIDS =";(R2+S2)*100/X2
5045 LET Q(35)=(R2+S2)*100/X2
5050 PRINT"SOLVENT            =";S3*100/X2
5055 LET Q(36)=S3*100/X2
5070 RETURN
5100 PRINT"CODE,LINE   ";F5$;Z7
5110 PRINT "FILE,FORMAT";
5120 INPUT X$,F3
5130 FILE #4,X$
5140 APPEND #4
5141 PRINT #4,V$
5142 PRINT #4,V$
5143 PRINT #4,V$
5144 PRINT #4,V$
5150 PRINT #4,"CODE";TAB(15);F5$
5160 PRINT #4,V$
5170 PRINT #4,"LINE";TAB(15);Z7
5180 PRINT #4,V$
5190 PRINT #4,"GLOSS";TAB(15);G1
5200 PRINT #4,V$
5210 PRINT #4,"M.I.";TAB(15);M8
5220 PRINT #4,V$
5230 IF F3=1 THEN 5320
5240 PRINT #4,"PVC";TAB(15);Q(37)
5250 PRINT #4 ,V$
5260 PRINT #4,"DFT";TAB(15);INT(Q(38)*10↑3+.5)/10↑3;" MILS"
5270 PRINT #4,V$
5280 PRINT #4,"T.S";TAB(15);Q(39)*100;"%"
5290 PRINT #4,V$
5300 PRINT #4,"PIG. COST";TAB(15);Q(40);"  $/GAL"
5310 PRINT #4,V$
5320 PRINT #4,"LOAD FORMULA"
5330 PRINT #4,V$
5340 PRINT #4,"    CODE            PIGMENT        PASTE"
5350 PRINT #4,V$
5360 FOR I=1 TO N5
5370 PRINT #4,TAB(5);PS(I);TAB(23);INT(Q(4+I)*10↑5+.5)/10↑5;
5380 IF F3=1 THEN 5410
5390 PRINT #4,TAB(40);Q(I+27)
5400 GO TO 5420
5410 PRINT #4,TAB(40);Q(I+20)
5420 PRINT #4,V$
5430 NEXT I
5440 IF F3=1 THEN 5520
5450 PRINT #4,TAB(5);"RESIN";TAB(40);Q(35)
5460 PRINT #4,V$
5470 PRINT #4,TAB(5);"SOLVENT";TAB(40);Q(36)
5520 GO TO 4780
9000 END
```

Appendix XVII
Execution of Program Formula

```
FORMULA      17:22      07/02/69
STARTING REFL. SET? 4
CODE,LINE,PLACES,GLOSS  R44   1 , 3 , 95
NO. OF PIG.? 5
PIG. CODES? PW812,PN801,PG216,PL806,PY417

SPECTRAL MATCH CONC.

0.81789  0.01659  0.03168  0.03728  0.09657

SUM OF SQUARES          5.70068E-5

COLOR MATCH CONC.

0.8214  0.01712  0.04276  0.03307  0.08566

% TINT PASTE

PL806     NOT IN LINE - USING PURE PIG
PY417     NOT IN LINE - USING PURE PIG
70.4899  9.90851  13.4169  1.72244  4.46223

M.I.= 0.117108

DELTA C=   -3.52859E-5   2.21252E-4  -1.11878E-4
DELTA A=   -2.52581E-3   9.50001E-2  -0.06885
```

Appendix XVII (cont'd.)
Option 1 of FORMULA - Next Reflectance Set

```
OPTION? 1

CODE,LINE,PLACES,GLOSS  R55   1 , 3 , 95

NO. OF PIG.? 4

PIG. CODES? PW812,PL807,PY807,PY120

SPECTRAL MATCH CONC.

0.9615  0.00752  0.01363  0.01735

SUM OF SQUARES          3.95932E-4

COLOR MATCH CONC.

0.96187  0.00742  0.01324  0.01748

% TINT PASTE

PY807     NOT IN LINE - USING PURE PIG
PY120     NOT IN LINE - USING PURE PIG
94.5953  3.57106  0.790328  1.04335

M.I.= 2.82168E-2

DELTA C=   9.53674E-7  -1.43051E-6   5.21541E-7
DELTA A=   3.10421E-3   1.80678E-2   2.14496E-2
```

Appendix XVII (cont'd.)
Option 2 of FORMULA - Next Reflectance, Same Pigments

```
OPTION? 2

CODE,LINE,PLACES,GLOSS  R66   1 , 3 , 95

PIG. CODES PW812,PL807,PY807,PY120,
SPECTRAL MATCH CONC.

0.25622  -0.00017   0.22707   0.51687

SUM OF SQUARES          1.45861E-2

COLOR MATCH CONC.

0.21159  -0.00071   0.31666   0.47247

% TINT PASTE

PY807     NOT IN LINE - USING PURE PIG
PY120     NOT IN LINE - USING PURE PIG
30.7942  -0.508173  27.9748  41.7392

M.I.= 1.85943

DELTA C=   4.29153E-6   1.83582E-5  -9.29832E-5
DELTA A=  -2.61402E-3  -1.7972     0.476862
```

Appendix XVII (cont'd.)
Option 3 of FORMULA - Same Reflectance, New Pigments

```
OPTION? 3

CODE,LINE,PLACES,GLOSS  R66   1 , 3 , 95

NO. OF PIG.? 4

PIG. CODES? PW812,PN801,PY815,PY818

SPECTRAL MATCH CONC.

0.14671  0.00283  0.11326  0.73721

SUM OF SQUARES          2.60491E-5

COLOR MATCH CONC.

0.14566  0.00283  0.11296  0.73855

% TINT PASTE 14.7217  1.92775  11.0874  72.2631

M.I.= 5.44168E-2

DELTA C=   7.00951E-5   2.44975E-4  -3.87669E-4
DELTA A=   1.23692E-3  -4.82249E-2   2.43206E-2
```

Appendix XVII (cont'd.)
Option 4 of FORMULA - Another Iteration in Color Match

```
OPTION? 4

COLOR MATCH CONC.

0.14565  0.00283  0.11295  0.73856

% TINT PASTE 14.721  1.92776  11.0872  72.2641

M.I.= 5.42965E-2

DELTA C=   0  -1.07288E-6   2.38419E-6
DELTA A=   1.14918E-3  -4.84593E-2   2.44684E-2
```

Appendix XVII (cont'd.)

Option 5 of FORMULA - Vectors

```
ØPTIØN? 5

1% MACHINE LINE VECTØRS-SØURCE C 0.2868  -3.4141  -0.4197   0.097
-0.1306  -3.7181   1.2215  -0.0616
-0.1485  -5.0472  -0.4451   0.2332
```

Appendix XVII (cont'd.)

Option 6 of FORMULA - Hiding

```
ØPTIØN? 6

SUB,TØL,PVC,DFT,WFS? 1,.01,20,0,.5
CØLØR  DIFFERENCE  = 0.011
DRY FILM THICKNESS = 0.849987     MILS
PVC                = 20
WEIGHT FRAC SØLID  = 0.5
PIGMENT     CØST   = 1.06042      $/GAL
PIGMENT     CØST   = 0.177188     $/100  SQ.FT

LØAD FØRMULA IN WEIGHT %

%TINT PASTE LINE 1
      PW812              = 6.90446
      PN801              = 0.904109
      PY815              = 5.19996
      PY818              = 33.8912
CLEAR AT 50 % SØLIDS     = 24.9604
SØLVENT                  = 28.1399
```

Appendix XVII (cont'd.)

Option 7 of FORMULA - Reflectance Difference

```
ØPTIØN? 7

REF. DIFF.

BATCH-STANDARD
400  -0.001
410  -0.001
420  -0.001
430   0.001
440   0
450   0
460  -0.001
470   0
480   0.001
490   0.002
500   0.001
510  -0.001
520   0.001
530   0.001
540   0.001
550   0
560   0.001
570  -0.003
580  -0.001
590   0
600   0
610   0
620   0
630   0.001
640   0
650   0.001
660  -0.001
670   0
680   0.001
690   0.001
700  -0.001
```

Appendix XVII (cont'd.)

Option 8 of FORMULA - Starting Set

```
ØPTIØN? 8
STARTING REFL. SET? 2

CØDE,LINE,PLACES,GLØSS  R22  1 , 3 , 95

NØ. ØF PIG.? 4

PIG. CØDES? PW812,PN801,PY818,PG216

SPECTRAL MATCH CØNC.

0.60977   0.00551   0.3771   0.00762

SUM ØF SQUARES           6.7479E-5

CØLØR MATCH CØNC.

0.61089   0.00552   0.37612   0.00747

% TINT PASTE 58.7647   3.58075   35.0266   2.62798

M.I.= 4.67228E-2

DELTA C=   2.2316E-4   9.08375E-4   9.29832E-5
DELTA A=   4.52515E-4  4.68338E-2  -8.49915E-3
```

Appendix XVII (cont'd.)

Option 9 of FORMULA - Write Summary to File

```
ØPTIØN? 9
CØDE,LINE        R66 1
FILE,FØRMAT? DETRØIT,1

ØPTIØN? 9
CØDE,LINE        R66 1
FILE,FØRMAT? DETRØIT,2
```

Appendix XVIII

Summary Formats

```
DETRØIT        12:38      07/03/69

CØDE           R66
LINE           1
GLØSS          95
M.I.           5.44168E-2
LØAD FØRMULA
   CØDE              PIGMENT        PASTE
   PW812             0.14566        14.7217
   PN801             0.00283         1.92775
   PY815             0.11296        11.0874
   PY818             0.73855        72.2631

CØDE           R66
LINE           1
GLØSS          95
M.I.           5.44168E-2
PVC            20
DFT            0.85   MILS
T.S            50 %
PIG. CØST      1.06042    $/GAL
LØAD FØRMULA
   CØDE              PIGMENT        PASTE
   PW812             0.14566        6.90446
   PN801             0.00283        0.904109
   PY815             0.11296        5.19996
   PY818             0.73855       33.8912
   RESIN                           24.9604
   SØLVENT                         28.1399
```

Appendix XIX

Entering DATA in the VDATA File

```
ØLD
ØLD FILE NAME--VDATA
READY
SCR
READY
TAP
READY
DSM
READY
"P44" 3 5
"W812" 70.49 "N801" 9.9085 "G216" 13.4168 "L806" 1.72245
"Y417" 4.46225
READY
```

Appendix XX

Program Vector

```
100 FILES VDATA;W812
110 DELIMIT #1,( )
120 DIM A(31,7),B(31,1),C(6,31),D(6,1),E(6,7)
130 DIM F(7,67)
140 DIM G(2,3),H(6,1)
150 DIM J(2,2),K(6,1),L(2,3),M(3,3),Ø(1,7)
160 DIM R(3,1),S(20,3),T(1,31)
```

Appendix XX (cont'd.)

```
 170 DIM V(6,7),W(1,6),X(31,6)
 180 DIM N(5),P(7),Q(20),U(7),Y(5),Z(6)
 190 DIM P$(7)
 200 MAT M=ZER(1,7)
 210 PRINT "STARTING SET";
 220 INPUT N1
 230 FOR I=1 TO N1
 240 READ #1,F5$,Z7,N5
 250 FOR J=1 TO N5
 260 READ #1,P$(J),M(1,J)
 270 NEXT J
 280 NEXT I
 290 GO TO 360
 300 READ #1,F5$,Z7,N5
 310 IF END#1 THEN 2900
 320 MAT M=ZER(1,N5)
 330 FOR I=1 TO N5
 340 READ #1,P$(I),M(1,I)
 350 NEXT I
 360 PRINT
 370 PRINT "CODE, LINE, NO. OF PIG.";"    ";F5$;Z7;N5
 380 PRINT
 390 PRINT "PIG. CODE----Z TINT PASTE"
 400 FOR I=1 TO N5
 410 FILE #2,P$(I)
 420 MAT READ #2,A(1,67)
 430 FOR J=1 TO 67
 440 LET F(I,J)=A(1,J)
 450 NEXT J
 460 PRINT P$(I),M(1,I)
 470 LET O(1,I)=F(1,64+Z7)
 480 NEXT I
 490 LET B1=0
 500 LET Z9=0
 510 LET K9=0
 520 FOR I=1 TO N5
 530 LET P(I)=M(1,I)*O(1,I)
 540 LET B1=B1+P(I)
 550 NEXT I
 560 LET C3=.576
 570 LET C4=.005
 580 LET C5=.4
 590 MAT E=ZER(6,N5)
 600 MAT V=ZER(6,N5)
 610 MAT A=ZER(31,N5)
 620 MAT M=ZER(3,3)
 630 LET Z9=Z9+1
 640 RESTORE
 650 MAT READ C(6,31)
 660 GO TO 820
 670 REM SUB FOR R,R',SUM KC,SUM SC
 680 FOR I=1 TO 31
 690 LET N1=N2=0
 700 FOR J=1 TO N5
 710 LET S=31+I
 720 LET N1=U(J)*F(J,I)+N1
 730 LET N2=U(J)*F(J,S)+N2
 740 NEXT J
 750 LET X(I,4)=N1
 760 LET X(I,5)=N2
 770 LET X1=N1/N2
 780 LET X(I,6)=X1+1-SQR(X1↑2+2*X1)
 790 LET T(I,I)=((C3+C4*C5)*X(I,6)-C4)/(1-C5*X(I,6))
 800 NEXT I
 810 RETURN
 820 FOR J=1 TO N5
 830 LET U(J)=P(J)
 840 NEXT J
 850 GO SUB 680
 860 FOR I=1 TO 31
 870 LET B(I,1)=T(I,1)
 880 LET X1=X(I,4)/X(I,5)
 890 LET S1=X(I,6)*C5
 900 LET N4=(1/((1-S1)↑2))*(1-((X1+1)/(SQR(X1↑2+2.*X1))))
 910 LET N1=X(I,4)
 920 LET N2=X(I,5)
 930 FOR J=1 TO N5
 940 LET S=31+I
 950 LET N6=(N2*F(J,I)-N1*F(J,S))/N2↑2
 960 LET A(I,J)=N4*N6
 970 NEXT J
 980 NEXT I
 990 LET Y(1)=.100079
1000 LET Y(2)=.100027
1010 LET K2=1
1020 GO TO 2230
1030 LET K2=0
1040 MAT E=C*A
1050 LET I=1
1060 LET P1=1
1070 FOR J7=1TO 2
1080 LET Y1=(25.29/3)*10*Y(J7)*(.578-.002)
1090 LET Y2=(106/3)*10*Y(J7)*(.578-.002)
1100 LET Y3=(42.34/3)*10*Y(J7)*(.578-.002)
1110 FOR J6=1 TO N5
1120 LET V(I,J6)=Y1*(1/(G(P1,1)↑(2/3)))*E(I+1,J6)
1130 LET V(I+1,J6)=(1/(G(P1,2)↑(2/3)))*(1.0216*E(I,J6)
                  -.00122*E(I+2,J6))
1140 LET V(I+1,J6)=Y2*(V(I+1,J6)-(1/(G(P1,1)↑(2/3)))
                  *E(I+1,J6))
1150 LET V(I+2,J6)=(1/(G(P1,1)↑(2/3)))*E(I+1,J6)
1160 LET V(I+2,J6)=Y3*(V(I+2,J6)-(1/(G(P1,3)↑(2/3)))
                  *.8467*E(I+2,J6))
1170 NEXT J6
1180 LET I=I+3
1190 LET P1=P1+1
1200 NEXT J7
1210 IF K9=1 THEN 1390
1220 PRINT
```

Appendix XX (cont'd.)

```
1230 PRINT "SOURCE C"
1240 PRINT
1250 PRINT "          L=  ";L(2,1)
1260 PRINT "          A=  ";L(2,2)
1270 PRINT "          B=  ";L(2,3)
1280 PRINT
1290 PRINT "L,A,B CHECK";
1300 INPUT C1$
1310 IF C1$="YES" THEN 2520
1320 IF K9=1 THEN 1370
1330 PRINT
1340 PRINT "L,A,B OF STANDARD";
1350 INPUT L,A,B
1360 PRINT
1370 LET K9=1
1380 LET Z9=1
1390 LET R(1,1)=L-L(2,1)
1400 LET R(2,1)=A-L(2,2)
1410 LET R(3,1)=B-L(2,3)
1420 LET E1=SQR(R(1,1)↑2+R(2,1)↑2+R(3,1)↑2)
1430 IF E1<=1.E-3 THEN 1220
1440 IF Z9>6 THEN 1220
1450 IF N5>3 THEN 1480
1460 MAT A=ZER(3,2)
1470 GO TO 1500
1480 MAT A=ZER(3,3)
1490 IF N5>4 THEN 1570
1500 FOR I= 1TO N5-1
1510 LET A(1,I)=V(4,I+1)
1520 LET A(2,I)=V(5,I+1)
1530 LET A(3,I)=V(6,I+1)
1540 NEXT I
1550 REM Q
1560 GO TO 1850
1570 IF N5>5 THEN 1660
1580 MAT S=ZER(4,3)
1590 FOR L1=1 TO 4
1600 FOR L2= 1TO 3
1610 READ S(L1,L2)
1620 NEXT L2
1630 GO SUB 1750
1640 NEXT L1
1650 GO TO 2480
1660 MAT S=ZER(20,3)
1670 FOR L1=1 TO 10*(N5-5)
1680 FOR L2= 1TO 3
1690 READ S(L1,L2)
1700 NEXT L2
1710 GO SUB 1750
1720 NEXT L1
1730 GO TO 2480
1740 REM R
1750 LET Q(1)=S(L1,1)
1760 LET Q(2)=S(L1,2)
1770 LET Q(3)=S(L1,3)
1780 REM S
1790 FOR A1= 1TO 3
1800 LET A(1,A1)=V(4,Q(A1))
1810 LET A(2,A1)=V(5,Q(A1))
1820 LET A(3,A1)=V(6,Q(A1))
1830 NEXT A1
1840 REM T
1850 IF N5>3 THEN 1910
1860 MAT W=TRN(A)
1870 MAT J=W*A
1880 MAT E=INV(J)
1890 MAT M=E*W
1900 GO TO 1920
1910 MAT M=INV(A)
1920 MAT H=M*R
1930 LET C1=10↑(.01245*R(1,1))
1940 MAT H=(C1)*H
1950 REM U
1960 LET P4=0
1970 IF N5>4 THEN 2050
1980 FOR J8=2 TO N5
1990 LET U(J8)=P(J8)+H(J8-1,1)
2000 LET P4=P4+U(J8)
2010 NEXT J8
2020 LET P4=P4+P(1)
2030 LET U(1)=P(1)
2040 GO TO 2140
2050 FOR J8= 1TO N5
2060 LET U(J8)=P(J8)
2070 NEXT J8
2080 FOR A1= 1TO 3
2090 LET U(Q(A1))=P(Q(A1))+H(A1,1)
2100 NEXT A1
2110 FOR J8= 1TO N5
2120 LET P4=P4+U(J8)
2130 NEXT J8
2140 FOR I=1 TO N5
2150 REM TO KEEP BASIS SAME AS INPUT LINE 1880 SHOULD
2160 REM READ 1880 LET U(I)=U(I)*B1/P4
2170 LET U(I)=U(I)
2180 NEXT I
2190 GO SUB 680
2200 FOR I=1 TO 31
2210 LET B(I,1)=T(I,1)
2220 NEXT I
2230 MAT K=C*B
2240 LET I=1
2250 FOR J5= 1 TO 2
2260 MAT D=(10*Y(J5))*K
2270 LET G(J5,1)=D(I+1,1)
2280 LET G(J5,2)=.8*(1.277*D(I,1)-.2132*D(I+2,1))
               +.2*.8467*D(I+2,1)
2290 LET G(J5,3)=.8467*D(I+2,1)
2300 LET L(J5,1)=25.29*((G(J5,1)↑(1/3))-18.38
```

Appendix XX (cont'd.)

```
2310 LET L(J5,2)=106*((G(J5,2)↑(1/3))-G(J5,1)↑(1/3))
2320 LET L(J5,3)=42.34*(G(J5,1)↑(1/3)-G(J5,3)↑(1/3))
2330 LET I=I+3
2340 NEXT J5
2350 IF K2=1 THEN 1030
2360 LET M7=SQR((L-L(2,1))↑2+(A-L(2,2))↑2+(B-L(2,3))↑2)
2370 IF N5>4 THEN 2390
2380 GO TO 2420
2390 IF L1<2 THEN 2420
2400 IF (M7-M8)<0 THEN 2420
2410 RETURN
2420 LET M8=M7
2430 FOR I= 1 TO N5
2440 LET Q(4+I)=U(I)
2450 NEXT I
2460 IF N5<5 THEN 2480
2470 RETURN
2480 FOR I=1 TO N5
2490 LET P(I)=Q(I+4)
2500 NEXT I
2510 GO TO 610
2520 PRINT
2530 PRINT"!% TINTPASTE VECTORS-SOURCE C"
2540 PRINT
2550 MAT M=ZER(1,N5)
2560 FOR J=1 TO 3
2570 ON J GO TO 2580,2600,2620
2580 LET P$="DL/DC"
2590 GO TO 2640
2600 LET P$="DA/DC"
2610 GO TO 2640
2620 LET P$="DB/DC"
2630 GO TO 2640
2640 LET L=J+3
2650 PRINT P$;
2660 FOR I=1 TO N5
2670 PRINT TAB(10);
2680 PRINT INT(V(L,I)*B(1,I)*10↑4+.5)/10↑4;
2690 LET M(1,I)=M(1,I)+(V(L,I)*B(1,I))↑2
2700 NEXT I
2710 PRINT
2720 NEXT J
2730 PRINT
2740 PRINT"E="
2750 FOR I=1 TO N5
2760 PRINT INT(SQR(M(1,I))*10↑4+.5)/10↑4;
2770 NEXT I
2780 IF K9=1 THEN 2800
2790 GO TO 2870
2800 PRINT
2810 PRINT
2820 PRINT "CORR. % TINTPASTE AT CONSTANT PIG. WEIGHT"
2830 PRINT
2840 FOR I=1 TO N5
2850 PRINT INT(P(I)*10↑5/B(1,I)+.5)/10↑5;
2860 NEXT I
2870 PRINT
2880 GO TO 300
2890 PRINT
2900 DATA 0.019,0.071,0.262,0.649,0.926,1.031,1.019,
     0.776,0.428
2910 DATA 0.160,0.027,0.057,0.425,1.214,2.313,3.732,
     5.510,7.571
2920 DATA 9.719,11.579,12.704,12.669,11.373,8.980,
     6.558,4.336
2930 DATA 2.628,1.448,0.804,0.404,0.209
2940 DATA 0.001,0.002,0.008,0.027,0.061,0.117,0.210,0.362
2950 DATA 0.622,1.039,1.792,3.080,4.771,6.322,7.600,8.568
2960 DATA 9.222,9.457,9.228,8.540,7.547,6.356,5.071,3.704
2970 DATA 2.562,1.637,0.972,0.530,0.292,0.146,0.075
2980 DATA 0.093,0.340,1.256,3.167,4.647,5.435,5.851,5.116
2990 DATA 3.636,2.324,1.509,0.969,0.525,0.309,0.162,0.075
3000 DATA 0.036,0.021,0.018,0.012,0.010,0.004,0.003,0.000
3010 DATA 0.000,0.000,0.000,0.000,0.000,0.000,0.000
3020 DATA 0.085,0.329,1.238,2.997,3.975,3.915,3.362,2.272
3030 DATA 1.112,0.363,0.052,0.089,0.576,1.523,2.785,4.282
3040 DATA 5.880,7.322,8.417,8.984,8.949,8.325,7.070,5.309
3050 DATA 3.693,2.349,1.361,0.708,0.369,0.171,0.082
3060 DATA 0.002,0.009,0.037,0.122,0.262,0.443,0.694,1.058
3070 DATA 1.618,2.358,3.401,4.833,6.462,7.934,9.149,9.832
3080 DATA 9.841,9.147,7.992,6.627,5.316,4.176,3.153,2.190
3090 DATA 1.443,0.886,0.504,0.259,0.134,0.062,0.029
3100 DATA 0.404,1.570,5.949,14.628,19.938,20.638,
     19.299,14.972
3110 DATA 9.461,5.274,2.864,1.520,0.712,0.388,0.195,0.086
3120 DATA 0.039,0.020,0.016,0.010,0.007,0.002,0.002,0.000
3130 DATA 0.000,0.000,0.000,0.000,0.000,0.000,0.000
3140 DATA 1,2,3,1,2,4,1,3,4,2,3,4,1,2,5,1,3,5,1,
     4,5,2,3,5,2,4,5
3150 DATA 3,4,5,1,2,6,1,3,6,1,4,6,2,3,6,2,4,6,3,
     4,6,1,5,6,2,5,6,
3160 DATA 3,5,6,4,5,6
3170 END
```

Appendix XXI
Execution of Program Vector

```
VECTOR      12:50      07/03/69

STARTING SET? 1

CODE, LINE, NO. OF PIG.   P44 3   5

PIG. CODE----% TINT PASTE
W812              70.49
N801               9.9085
G216              13.4168
L806               1.72245
Y417               4.46225
```

Appendix XXI (cont'd.)

```
SOURCE C

L=   44.6054
         A=  -15.9729
         B=   -5.20284

L,A,B CHECK? YES

1% TINTPASTE VECTORS-SOURCE C

DL/DC    0.1956 -0.9798 -0.1856 -0.8349 -0.033
DA/DC   -0.0067  0.8752 -0.4907 -0.601  -0.1308
DB/DC   -0.0002  0.1476 -0.0482 -1.2992  0.3226

E=       0.1957  1.3221  0.5269  1.6571  0.3496

USED    2.35 UNITS

VECTOR      12:53      07/03/69

STARTING SET? 1

CODE, LINE, NO. OF PIG.   P44 3   5

PIG. CODE----% TINT PASTE
W812              70.49
N801               9.9085
G216              13.4168
L806               1.72245
Y417               4.46225

SOURCE C

L=   44.6054
         A=  -15.9729
         B=   -5.20284

L,A,B CHECK? NO

L,A,B OF STANDARD? 40,-12,-3

SOURCE C

L=   40.
         A=  -12.
         B=   -3.

L,A,B CHECK? YES

1% TINTPASTE VECTORS-SOURCE C

DL/DC    0.2013 -0.6971 -0.1569 -0.6862 -0.0202
DA/DC   -0.0123  0.5039 -0.4248 -0.6463 -0.0902
DB/DC    0.0013  0.0279 -0.0853 -1.0837  0.2165

E=       0.2017  0.8606  0.4608  1.4363  0.2354

CORR. % TINTPASTE AT CONSTANT PIG. WEIGHT 69.2301  16.0232  15.2415  0.38809  5.4844

USED   5.47 UNITS
```

I claim:

1. A process of selecting pigments from a pigment library having a standard pigment to color match a surface coating, wherein said library pigments are nonflakelike pigments which scatter light diffusely, comprising the steps of:

generating signals representative of the reflectance spectrum of the surface coating; and controlling an automatic processing system in response to a stored program to perform the steps comprising:

a. generating signals representative of absorption constants (K) and scattering constants (S) of N library pigments, $N > 1$, b. in response to said reflectance spectrum signals and said absorption and scattering constant signals, generating signals representative of $N-1$ concentration ratios between $N-1$ nonstandard library pigments and the standard library pigment in accordance with:

$$\left(1 - \frac{2R'}{1+R'^2}\left(1 + \frac{K_1}{S_1}\right)\right) = \sum_{i=2}^{N}\left[\frac{2R'}{1+R'}\left(\frac{K_i + S_i}{S_i}\right) - \frac{S_i}{S_i}\right]\frac{C_i}{C_1}$$

where $R'$ = the corrected reflectance of the surface coating at a given wavelength, $K_1, S_1$ = the absorption and scatter constants of the standard library pigment at a given wavelength, $K_i, S_i$ = the absorption and scatter constants of the $i^{th}$ pigment in the library, at a given wavelength, $N$ = the number of pigments to be considered from the library, and $C_i/C_1$ = the concentration ratio of the $i^{th}$ pigment to the standard pigment, c. and generating, in response to the $N-1$ concentration ratio signals, signals representative of library pigments selected for use in matching the color of the surface coating.

2. The process of claim 1 wherein said stored program controls the automatic processing system to perform the additional step of:

refining the concentration ratio signals obtained in step (b) by nonlinear least square solution procedures based on the total differential of the dependent variable prior to performing step (c).

3. The process of claim 1 wherein the concentrations $C_i$ and $C_1$ are weight fractions and wherein step (c) comprises the steps of:

d. generating a signal representative of the weight fraction of the standard library pigment in accordance with:

$$C_1 = 1 \Big/ \left( 1 + \sum_{i=1}^{N} C_i/C_1 \right)$$

and e. generating signals representative of the weight fractions of the nonstandard library pigments considered from the library in accordance with:

$C_i = (C_i/C_1)(C_1)$, $i = 2...N$, where $C_i$ = weight fraction of the $i^{th}$ library pigment, $C_1$ = weight fraction of the standard library pigment, $N$ = the number of pigments considered from the library, and $C_i/C_1$ = the concentration ratio of the $i^{th}$ pigment to the standard library pigment.

4. The process of claim 3 wherein said stored program controls of the automatic processing system to perform the further steps of:

f. generating a signal representative of a predetermined weight fraction value, g. comparing the nonstandard weight fraction signals with the predetermined weight fraction signal, and h. eliminating from further processing the compared weight fraction signals having a value less than the predetermined weight fraction signal.

5. The process of claim 4 wherein said stored program controls the automatic processing system to perform the further steps of:

i. repeating steps (a), (b) and (d) through (h) after eliminating from further processing the absorption and scattering constants of the nonstandard pigments having a weight fraction value less than the predetermined weight fraction value as determined in step (g) to thereby reduce $N$ by the number of nonstandard pigments eliminated, and j. repeating step (i) until each of the remaining nonstandard pigments has a weight fraction signal with a value at least as great as the predetermined weight fraction signal.

6. The process of claim 1 wherein said reflectance spectrum signal generating step comprises generating signals representative of reflectance values of the surface coating at a plurality of wavelengths to provide the reflectance spectrum of the surface coating.

7. The process of claim 6, wherein the automatic processing system comprises storage means, and wherein said reflectance spectrum signal generating step comprises:

measuring the reflectance values of the surface coating by a spectrophotometer, and entering the reflectance values in the storage means to provide a source for generating said reflectance value signals.

8. The process of claim 1 wherein said reflectance spectrum signal generating step comprises generating signals representative of reflectance values of the surface coating at a plurality of wavelengths between 400 and 700 millimicrons to provide the reflectance spectrum of the surface coating.

9. The process of claim 8 wherein said reflectance wavelengths are at 10 millimicrons to provide 31 reflectance values.

10. The process of claim 1 wherein the automatic processing system comprises storage means, and wherein the standard library pigment absorption constant and scattering constant signals generated in step (a) are initially generated by the steps comprising:

d. measuring the reflectance at a plurality of wavelengths (1) of each of a plurality of panels each having the standard library pigment as a chemical coating at a different level of incomplete hiding, (2) of a panel having the standard library pigment as a chemical coating at a level of complete hiding, and (3) of the substrates;

e. storing signals representative of the measured reflectances in said storage means;

f. storing signals representative of the weight of the standard library pigment per unit area on each of the panels in said storage means; and g. controlling said automatic processing system in response to another stored program to perform the steps comprising:

h. in response to the signals stored in steps (e) and (f), generating a signal representative of a scattering constant of the standard library pigment in accordance with:

$$S = \frac{R'}{X(1-R'^2)} \ln \frac{[Rg-R'][1-R''R']}{[RgR'-1][R'-R'']}$$

where $S$ = scattering constant, $R'$ = the corrected reflectance at complete hiding at a given wavelength, $R''$ = the corrected reflectance at incomplete hiding at a given wavelength, $Rg'$ = the reflectance of the substrate at a given wavelength, and $X$ = the weight of the standard pigment per unit area, i. repeating step (h) at each wavelength at which the reflectance is measured in step (d), j. averaging the generated scattering constant signals in each substrate set to generate signals representative of the scattering constant of the standard library pigment at each wavelength averaged over all reflectance spectra at incomplete hiding, k. in response to the signals generated in steps (e) and (j), generating signals representative of absorption constants of the standard library pigment in accordance with:

$$K = S(1-R')^2/2R'$$

where $K$ = absorption constant of the standard pigment, $S$ = scattering constant of the standard pigment, and $R'$ = the corrected reflectance at complete hiding at a given wavelength, and (l) entering the standard library pigment scattering constants signals generated in step (j), and the standard library pigment absorption constants signals generated in step (k) in said storage means.

11. The process of claim 10 wherein the nonstandard library pigment absorption constant and scattering constant signals generated in step (a) are initially generated by the steps comprising:

m. measuring the reflectance at a plurality of wavelengths of each of a plurality of panels each having a chemical coating of a different concentration of a plurality of nonstandard library pigments and the standard library pigments;

n. entering signals representative of the reflectances measured in step (m) and of the concentration of the library pigments used in step (m) in said storage means; and o. controlling said automatic processing system in response to still another stored program to perform the steps comprising:

p. in response to the scattering constant signals entered in said storage means in step (l) and the signals entered in said storage means in step (n), generating signals representative of estimates of the absorption and scattering constants of the nonstandard library pigments at each wavelength in accordance with:

$$(1-2R'/(1+R'^2))C_1 = \frac{2R'}{(1+R'^2)S_1}\sum_{i=2}^{N}C_iK_i - \left(1-\frac{2R'}{S_1(1+R'^2)}\right)\sum_{i=2}^{N}C_iS_i$$

where $R'$ = the corrected reflectance of the surface coating at a given wavelength, $S_1$ = the scattering constant of the standard library pigment at a given wavelength, $K_i, S_i$ = the absorption and scatter constants of the $i^{th}$ pigment in the library, at a given wavelength, $N$ = the number of pigments to be considered from the library, $C_i$ = the concentration of the $i^{th}$ pigment, and $C_1$ = the concentration of the standard library pigment, q. in response to the estimated scattering and absorption constant signals, generating improved nonstandard pigment scattering and absorption constant signals at each wavelength by nonlinear least square solution procedures based on the total differential of the dependent variable, and r. entering the improved nonstandard pigment scattering and absorption constant signals generated in step (q) in said storage means.

12. The process of claim 10 wherein the nonstandard library pigment absorption constant and scattering constant signals generated in step (a) are initially generated by the steps comprising:

m. measuring the reflectance at a plurality of wavelengths of each of a plurality of panels each having a chemical coating of a different concentration of a plurality of nonstandard library pigments and the standard library pigment;

n. entering signals representative of the reflectances measured in step (m) and of the concentrations of the library pigments used in step (m) in said storage means; and o. controlling said automatic processing system in response to still another stored program to perform the steps comprising:

p. in response to the scattering and absorption constant signals entered in said storage means in step (l) and the signals entered in said storage means in step (n), generating signals representative of estimates of the absorption and scattering constants of the nonstandard library pigments at each wavelength in accordance with:

$$C_1\left(1-\frac{2R'}{(1+R'^2)}\left(1+\frac{K_1}{S_1}\right)\right) = \frac{2R'}{(1+R'^2)S_1}\sum_{i=2}^{N}C_iK_i - \left(1-\frac{2R'}{(1+R'^2)S_1}\right)\sum_{i=2}^{N}C_iS_i$$

where $R'$ = the corrected reflectance of the surface coating at a given wavelength, $K_1, S_1$ = the absorption and scatter constants of the standard library pigment at a given wavelength, $K_i, S_i$ = the absorption and scatter constants of the $i^{th}$ pigment in the library, at a given wavelength, $N$ = the number of pigments to be considered from the library, $C_i$ = the concentration of the $i^{th}$ pigment, and $C_1$ = the concentration of the standard library pigment, q. in response to the estimated scattering and absorption constant signals, generating improved nonstandard pigment scattering and absorption constant signals at each wavelength by nonlinear least square solution procedures based on the total differential of the dependent variable, and r. entering the improved nonstandard pigment scattering and absorption constant signals generated in step (q) in said storage means.

13. The process of claim 1 further comprising the steps of:

d. selecting a subset of the library pigments selected in step (c); and e. controlling said automatic processing system in response to another program to perform the steps comprising:

f. repeating step (a) for the selected subset of library pigments to generate signals representative of an initial estimate of a composition of the subset to spectrally match the surface coating, g. in response to the subset composition signals generated in step (f), generating improved subset composition signals by nonlinear least square solution procedures, and h. generating a signal representative of the metameric index of the improved subset composition signals.

14. The process of claim 13 further comprising the steps of:

i. comparing the metameric index signal to a reference to determine whether the metameric index is within tolerance, j. when the metameric index is outside tolerance, repeat steps (d) through (i) with different subsets of the library pigments selected in step (c) until the generated metameric index signal is within tolerance.

15. The process of claim 14 further comprising the steps of:

k. when the metameric index signal is within tolerance, preparing a chemical coating composition in response to the improved subset composition signals, and l. determining the color coordinate difference between the surface coating and the prepared chemical coating composition.

16. The process of claim 15 further comprising the step of:

m. shading the prepared chemical coating composition with additional amounts of the subset of pigments when the color coordinate difference measured in step (l) is out of tolerance.

17. The process of claim 15 further comprising the step of:

m. measuring the metameric index of the prepared chemical coating composition.

18. The process of claim 17 further comprising the steps of:

n. repeating steps (d) through (m) with a different subset of the library pigments until the measured metameric index of the prepared chemical coating is within tolerance.

19. A system for selecting pigments from a pigment library having nonflakelike pigments which scatter light diffusely including a standard pigment to color match a colored surface coating comprising:

storage means for storing signals representative of the reflectance spectrum of the surface coating, and for storing signals representative of absorption constants (K) and scattering constants (S) of N library pigments, N>1; and processing means, programmed to operate on said reflectance spectrum signals and on said absorption constant and scattering constant signals in said storage means, for generating signals representative of N−1 concentration ratios between N−1 nonstandard library pigments and the standard library pigment in accordance with:

$$\left(1-\frac{2R'}{1+R'^2}\left(1+\frac{K_1}{S_1}\right)\right) = \sum_{i=2}^{N}\left[\frac{2R'}{1+R'}\left(\frac{K_i+S_i}{S_i}\right)-\frac{S_i}{S_1}\right]\frac{C_i}{C_1}$$

where $R'$ = the corrected reflectance of the surface coating at a given wavelength, $K_1, S_1$ = the absorption and scatter constants of the standard library pigment at a given wavelength, $K_i, S_i$ = the absorption and scatter constants of the $i^{th}$ pigment in the library, at a given wavelength, $N$ = the number of pigments to be considered from the library, and $C_i/C_1$ = the concentration ratio of the $i^{th}$ pigment to the standard pigment, said processing means being further programmed to operate on the $N-1$ concentration ratio signals for generating signals representative of library pigments selected for use in matching the color of the surface coating.

20. The system of claim 19 wherein the concentrations $C_i$ and $C_1$ are weight fractions and wherein said processing means is programmed to operate on the $N-1$ concentration ratio signals by:

generating a signal representative of the weight fraction of the standard library pigment in accordance with:

$$C_1 = 1 \bigg/ \left(1 + \sum_{i=1}^{N} C_i/C_1 \right)$$

and generating signals representative of the weight fractions of the nonstandard library pigments considered from the library in accordance with:

$$C_i = (C_i/C_1)(C_1), i=2...N,$$

where $C_i$ = weight fraction of the $i^{th}$ library pigment, $C_1$ = weight fraction of the standard library pigment, $N$ = the number of pigments considered from the library, and $C_i/C_1$ = the concentration ratio of the $i^{th}$ library pigment to the standard library pigment.

21. The system of claim 20 wherein said processing system is further programmed for generating a signal representative of a predetermined weight fraction value, for comparing the nonstandard weight fraction signals with the predetermined weight fraction signal, and for eliminating from further processing the compared weight fraction signals having a value less than the predetermined weight fraction signal.

22. The system of claim 19 further comprising:

means for measuring the reflectance at a plurality of wavelengths (1) of each of a plurality of panels each having a standard library pigment chemical coating at a different level of incomplete hiding, (2) of a panel having the standard chemical coating at a level of complete hiding, and (3) of the substrates;

means for storing signals representative of the measured reflectances, and for storing signals representative of the weight of the standard library pigment per unit area on each of the panels; and said processing means being further programmed to:

a. operate on said measured reflectance signals and on said weight signals for generating signals representative of scattering constants of the standard library pigment in accordance with:

$$S = \frac{R'}{X(1-R'^2)} \ln \frac{[Rg' - R'][1 - R''R']}{[Rg'R' - 1][R' - R'']}$$

where $S$ = scattering constant, $R'$ = the corrected reflectance at complete hiding at a given wavelength, $R''$ = the corrected reflectance at incomplete hiding at a given wavelength, $Rg'$ = the reflectance of the substrate at a given wavelength, and $X$ = the weight of the standard pigment per unit area, b. average the generated scattering constant signals in each substrate set to thereby generate signals representative of the scattering constant at each wavelength averaged over all reflectance spectra at incomplete hiding, and c. operate on said measured reflectance signals and on said averaged scattering constant signals for generating signals representative of absorption constants of the standard library pigment in accordance with:

$$K = S(1-R')^2/2R'$$

where $K$ = absorption constant of the standard pigment, $S$ = scattering constant of the standard pigment, and $R'$ = the corrected reflectance at complete hiding at a given wavelength.

23. The system of claim 22 further including:

means for storing signals representative of the reflectance at a plurality of wavelengths of each of a plurality of panels each having a chemical coating of a different concentration of a plurality of nonstandard library pigments and the standard library pigment, and of the concentrations of the library pigments; and said processing means being further programmed to:

d. operate on said signals representative of the reflectance at a plurality of wavelengths of each of a plurality of panels each having a chemical coating of a different concentration of a plurality of nonstandard library pigments and the standard library pigment, on said signals representative of the concentrations of the library pigments, and on said signals representative of averaged scattering constants for generating signals representative of estimates of the absorption and scattering constants of the nonstandard library pigments at each wavelength in accordance with:

$$(1 - 2R'/(1+R'^2))C_1 = \frac{2R'}{(1+R'^2)S_1} \sum_{i=1}^{N} C_i K_i$$

$$- \left(1 - \frac{2R'}{S_1(1+R'^2)}\right) \sum_{i=2}^{N} C_i S_i$$

where $R'$ = the corrected reflectance of the surface coating at a given wavelength, $S_1$ = the scattering constant of the standard library pigment at a given wavelength, $K_i, S_i$ = the absorption and scatter constants of the $i^{th}$ pigment in the library, at a given wavelength, $N$ = the number of pigments to be considered from the library, $C_i$ = the concentration of the $i^{th}$ pigment, and $C_1$ = the concentration of the standard library pigment, and e. operate on the estimated scattering and absorption constant signals for generating improved nonstandard pigment scattering and absorption constant signals at each wavelength by nonlinear least square solution procedures, based on the total differential of the dependent variable.

24. The system of claim 22 further including:

means for storing signals representative of the reflectance at a plurality of wavelengths of each of a plurality of panels each having a chemical coating of a different concentration of a plurality of nonstandard library pigments and the standard library pigment, and of the concentrations of the library pigments; and said processing means being further programmed to:

d. operate on said signals generated by (b) and (c), on said signals representative of the reflectance at a plurality of wavelengths of each of a plurality of panels each having a chemical coating of a different concentration of a plurality of nonstandard library pigments and the standard library pigment, and on signals representative of the concentrations of the library pigments for generating signals representative of estimates of the absorption and scattering constants of the nonstandard library pigments at each wavelength in accordance with:

$$C_1 \left(1 - \frac{2R'}{(1+R'^2)} \left(1 + \frac{K_1}{S_1}\right)\right)$$

$$= \frac{2R'}{(1+R'^2)S_1} \sum_{i=2}^{N} C_i K_i - \left(1 - \frac{2R'}{(1+R'^2)S_1}\right) \sum_{i=2}^{N} C_i S_i$$

where $R'$ = the corrected reflectance of the surface coating at a given wavelength, $K_1, S_1$ = the absorption and scatter constants of the standard library pigment at a given wavelength, $K_i, S_i$ = the absorption and scatter constants of the $i^{th}$ pigment in the library, at a given wavelength, $N$ = the number of pigments to be considered from the library, $C_i$ = the concentration of the $i^{th}$ pigment, and $C_1$ = the concentration of the standard library pigment, and e. operate on the estimated scattering and absorption constant signals for generating improved nonstandard pigment scattering and absorption constant signals at each wavelength by nonlinear least square solution procedures based on the total differential of the dependent variable.

25. A process of selecting pigments from a pigment library to color match a colored surface coating, wherein said library consists of nonflakelike pigments which scatter light diffusely, comprising the steps of:

generating signals representative of the reflectance spectrum of the surface coating; and controlling an automatic processing system in response to a stored program to perform the steps comprising:

a. generating signals representative of absorption constants (K) and scattering constants (S) of N library pigments, $N > 1$, b. in response to said reflectance spectrum signals and said absorption and scattering constant signals, generating signals representative of $N-1$ concentration ratios between $N-1$ nonstandard library pigments and the standard library pigment in accordance with a form of the following equation which is linear in the concentration ratio:

$$\frac{(1-R')^2}{2R'} = \frac{\sum_{i=1}^{N} K_i C_i}{\sum_{i=1}^{N} S_i C_i}$$

where $R'$ = the corrected reflectance of the surface coating at a given wavelength, $K_i, S_i$ = the absorption and scatter constants of the $i^{th}$ pigment in the library at a given wavelength, $N$ = the number of pigments to be considered from the library, and $C_i$ = the concentration of the $i^{th}$ pigment,

CERTIFICATE OF CORRECTION

Patent No. 3,601,589              Dated August 24, 1971

Inventor(s) William H. McCarty

It is certified that error appears in the above-identified patent and that said Letters Patent are hereby corrected as shown below:

Title page, column 1, line 6, "Mobile" should be --Mobil--.

Column 2, line 45, "for" should be from--.

Column 4, line 37, "$[X]^{11}$" should be --$[X]^{-1}$--; line 43, (second occurrence) "in" should be --is--.

Column 5, line 6, "kcan" should be --$\vec{k}$ can--.

Column 5, line 8, "$\vec{k} = [[X']^{T}[X']]\ ^{11}[X']^{T}\ \vec{f}(\overset{o}{y})$" should be --$\vec{k} = [[X']^{T}[X']]^{-1}\ [X']^{T}\ \vec{f}(\overset{o}{y})$--.

Column 5, line 19, "$\left(\dfrac{\partial y_j}{\partial y_j}\right)$" should be --$\left(\dfrac{\partial y_j}{\partial y_i}\right)$--.

Column 5, line 26, "dk=" should be --$d\vec{k} =$ --.

Column 8, line 65, "$\dfrac{\partial L}{\partial C_N}$" should be --$\dfrac{\partial b}{\partial C_N}$--.

Column 9, line 23, "$\dfrac{\partial L}{\partial C}$" should be --$\dfrac{\partial L}{\partial G}$--.

Column 9, line 55, "$\triangle C$" should be --$\triangle \vec{C}$--; line 64, "squire" should be --square--.

Column 9, line 71, "$\triangle \vec{C} = [[V]^{T}[V]]^{11}[V^{T} \triangle \vec{L}$" should be --$\triangle \vec{C} = [[V]^{T}[V]]^{-1}\ [V]^{T}\ \triangle \vec{L}$--.

PO-1050
(5/69)

UNITED STATES PATENT OFFICE
CERTIFICATE OF CORRECTION

Patent No. 3,601,589      Dated August 24, 1971

Inventor(s) William H. McCarty

It is certified that error appears in the above-identified patent and that said Letters Patent are hereby corrected as shown below:

Column 9, line 74, "$\Delta C$" should be --$\vec{\Delta} C$--.

Column 10, line 4, "BN-4)" should be (N-4)--; line 41, "specifications" should be --specification--.

Column 14, line 30, " $\sum_{i=1}^{N}$ " should be -- $\sum_{i=2}^{N}$ --.

Column 14, line 33, "indicated" should be --indicates--; line 36, "reference" should be --reflectance--.

Column 17, line 45, "5" should be --N5--; line 58, under caption SELECT Line Numbers, insert --260--; line 59, "1" should be --N1,--.

Column 18, line 2, "01" should be --#1--; line 17, "5" should be --N5.--; line 18, "5" should be --N5,--; line 30, "5" should be --N5.--.

Column 19, line 55, "64th" should be --65th--.

Column 20, line 22, "$10^{12}$" should be --$10^{-1}$--.

Column 23, line 28, insert paragraph --Table V summarizes the program characteristics of the G.E. Mark II - Time-Sharing Service.--

Column 51, line 38, "trols of the" should be --trols the--.

Column 58, line 25, insert --(c) and generating, in response to the N-1 concentration ratio signals, signals representative of library pigments selected for use in Page 2 of 3

PO-1050
(5/69)

UNITED STATES PATENT OFFICE
CERTIFICATE OF CORRECTION

Patent No. 3,601,589                    Dated August 24, 1971

Inventor(s) William H. McCarty

It is certified that error appears in the above-identified patent and that said Letters Patent are hereby corrected as shown below:

Column 58, line 25, continued matching the color of the surface coating.-- --.

Signed and sealed this 5th day of December 1972.

(SEAL)
Attest:

EDWARD M. FLETCHER, JR.                ROBERT GOTTSCHALK
Attesting Officer                      Commissioner of Patents